US012553528B2

(12) United States Patent
Goode et al.

(10) Patent No.: US 12,553,528 B2
(45) Date of Patent: Feb. 17, 2026

(54) PRESSURE RELIEF ASSEMBLY

(71) Applicant: Donaldson Company, Inc., Bloomington, MN (US)

(72) Inventors: Matthew J. Goode, Blaine, MN (US); Daniel J. Dotzler, Webster, MN (US); Raymond S. Cleveland, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 2 days.

(21) Appl. No.: 18/196,858

(22) Filed: May 12, 2023

(65) Prior Publication Data
US 2023/0366476 A1   Nov. 16, 2023

Related U.S. Application Data

(60) Provisional application No. 63/352,711, filed on Jun. 16, 2022, provisional application No. 63/341,725, filed on May 13, 2022.

(51) Int. Cl.
*F16K 17/04* (2006.01)
(52) U.S. Cl.
CPC .................................... *F16K 17/04* (2013.01)
(58) Field of Classification Search
CPC ............... Y10T 137/7837; F16K 17/04; F16K 17/0413; F16K 17/042; F16K 27/02; F16K 17/025; F16K 24/04
See application file for complete search history.

(56) References Cited

U.S. PATENT DOCUMENTS

| | | | |
|---|---|---|---|
| 1,365,720 A * | 1/1921 | Olson | F16K 24/04 |
| | | | 220/203.28 |
| 2,752,942 A * | 7/1956 | Trevaskis | F16K 17/0413 |
| | | | 137/512.1 |
| 7,678,492 B2 | 3/2010 | Schulte-Ladbeck | |
| 9,428,304 B2 | 8/2016 | Scagliarini et al. | |
| 9,947,908 B2 | 4/2018 | Mack et al. | |

(Continued)

FOREIGN PATENT DOCUMENTS

| | | | |
|---|---|---|---|
| AT | 196953 B | * | 4/1958 |
| AU | 533157 B2 | | 11/1983 |

(Continued)

OTHER PUBLICATIONS

Machine Translation of WO2022034170A1 retrieved from espacenet. com on Aug. 10, 2024. (Year: 2024).*

(Continued)

*Primary Examiner* — Jessica Cahill
(74) *Attorney, Agent, or Firm* — Mueting Raasch Group

(57) ABSTRACT

A pressure relief assembly has a frame having a coupling structure, a valve mounting surface, a valve opening within the valve mounting surface, a vent mounting surface, and a vent opening within the vent mounting surface. The vent opening is functionally parallel to the valve opening. A valve body is sealably disposed on the valve mounting surface across the valve opening. A first detent releasably secures the valve body to the frame. The first detent is configured to release the valve body from the frame upon a minimum pressure differential across the valve opening. A vent is coupled to the vent mounting surface across the vent opening.

20 Claims, 11 Drawing Sheets

(56) References Cited

U.S. PATENT DOCUMENTS

| | | | |
|---|---|---|---|
| 10,529,969 B2 | 1/2020 | Ogawa et al. | |
| 10,529,970 B2 | 1/2020 | Albukrek et al. | |
| 11,796,076 B1* | 10/2023 | Clericus | B01D 71/36 |
| 2008/0020268 A1 | 1/2008 | Hamada et al. | |
| 2010/0096035 A1 | 4/2010 | Appleby et al. | |
| 2013/0061942 A1* | 3/2013 | Hulsey | F16K 15/063 137/15.01 |
| 2013/0104999 A1* | 5/2013 | Mcgill | F16K 31/563 251/129.01 |
| 2017/0370489 A1* | 12/2017 | Zuercher | F16K 17/04 |
| 2018/0219200 A1* | 8/2018 | Albukrek | H01M 50/333 |
| 2019/0368623 A1* | 12/2019 | Medea | F16K 17/0413 |
| 2020/0240558 A1* | 7/2020 | Genev | F16L 5/10 |
| 2021/0127511 A1 | 4/2021 | Schulz et al. | |
| 2021/0320375 A1* | 10/2021 | Zbiral | H01M 50/308 |
| 2023/0038944 A1* | 2/2023 | Einoegg | H01M 50/394 |
| 2023/0175602 A1* | 6/2023 | Goldsche | F16K 17/0413 137/540 |
| 2023/0198086 A1 | 6/2023 | Raettich | |
| 2023/0291067 A1* | 9/2023 | Zbiral | F16K 17/048 |
| 2024/0213615 A1 | 6/2024 | Zbiral et al. | |

FOREIGN PATENT DOCUMENTS

| | | |
|---|---|---|
| CN | 209430816 U | 9/2019 |
| CN | 111192989 A | 5/2020 |
| CN | 108028338 B | 10/2020 |
| CN | 213420020 U | 6/2021 |
| CN | 214699384 U | 11/2021 |
| CN | 114033872 A | 2/2022 |
| CN | 117352946 A | 1/2024 |
| CN | 221407557 U | 7/2024 |
| CN | 221486729 U | 8/2024 |
| DE | 102013218911 A1 | 3/2015 |
| DE | 102013221760 A1 | 5/2015 |
| DE | 102015011663 A1 | 7/2016 |
| DE | 102019100094 A1 | 7/2020 |
| DE | 102021119448 A1 | 2/2022 |
| DE | 102021128942 A1 | 5/2023 |
| EP | 1636863 B1 | 11/2013 |
| EP | 3329528 B1 | 9/2020 |
| JP | 2013089375 A | 5/2013 |
| JP | 5880109 B2 | 3/2016 |
| JP | 6872546 B2 | 5/2021 |
| KR | 20210120783 A | 10/2021 |
| KR | 102397819 B1 | 5/2022 |
| WO | 2013121990 A1 | 8/2013 |
| WO | 2021197733 A1 | 10/2021 |
| WO | 2021219309 A1 | 11/2021 |
| WO | 2022034170 A1 | 2/2022 |
| WO | WO 2023198504 A1 | 10/2023 |

OTHER PUBLICATIONS

International Search Report and Written Opinion in PCT/US2023/022086, mailed Sep. 4, 2023, 11 pages.

Mcmaster-Carr, Spring Plungers, Catalog page, available on or before May 28, 2021, p. 3644.

* cited by examiner

PRESSURE RELIEF ASSEMBLY

RELATED APPLICATIONS

This application claims the benefit of U.S. Provisional Application No. 63/352,711, filed 16 Jun. 2022 and U.S. Provisional Application No. 63/341,725, filed 13 May 2022, the disclosures of which are incorporated by reference herein in their entireties.

TECHNOLOGICAL FIELD

The present disclosure is generally related to an assembly. More particularly, the present disclosure is related to a pressure relief assembly.

SUMMARY

The technology disclosed herein relates to, in part, a pressure relief assembly having a frame having a coupling structure, a valve mounting surface, a valve opening within the valve mounting surface, a vent mounting surface, and a vent opening within the vent mounting surface. The vent opening is functionally parallel to the valve opening. A valve body is sealably disposed on the valve mounting surface across the valve opening. A first detent releasably secures the valve body to the frame, and the first detent is configured to release the valve body from the valve frame upon a minimum pressure differential across the valve opening. A vent is coupled to the vent mounting surface across the vent opening.

In some such embodiments, the pressure relief assembly has a vent cover extending laterally across the vent, where the vent is positioned axially between the frame and the vent cover. Additionally or alternatively, the vent cover and the valve body are a single, unitary component. Additionally or alternatively, the pressure relief assembly has an environmental opening perpendicular to the vent cover. Additionally or alternatively, the environmental opening is positioned axially between the vent cover and the vent. Additionally or alternatively, the environmental opening is defined by the vent cover. Additionally or alternatively, the vent is a breathable membrane.

Additionally or alternatively, a second detent releasably secures the valve body to the frame. Additionally or alternatively, the second detent extends laterally from the frame to the valve body and is configured to release the valve body from the valve frame upon the minimum pressure differential across the valve opening. Additionally or alternatively, the second detent is a spring-loaded detent. Additionally or alternatively, a hinge pivotably couples the valve body to the frame.

Additionally or alternatively, the hinge is positioned oppositely of the first detent relative to the valve body in the lateral direction. Additionally or alternatively, the first detent extends laterally from the frame to the valve body. Additionally or alternatively, a valve stem extends in an axial direction from the valve body, and the first detent extends laterally from the frame to the valve stem. Additionally or alternatively, the first detent is a spring-loaded detent.

Additionally or alternatively, the first detent has a detent housing having a first end and an open second end. A compression spring is disposed in the detent housing, where the compression spring extends from the first end towards the open second end. A detent engagement surface is translatably disposed in the detent housing. The compression spring is compressibly disposed between the detent engagement surface and the first end of the detent housing.

Additionally or alternatively, the first detent is a magnet. Additionally or alternatively, the valve body has a circular profile in the lateral direction. Additionally or alternatively, the vent opening is geometrically parallel to the valve opening. Additionally or alternatively, the vent opening is geometrically non-parallel to the valve opening. Additionally or alternatively, a guard coupled to the frame, wherein the guard defines a plurality of openings spaced laterally across the valve airflow pathway and the vent airflow pathway. Additionally or alternatively, the assembly has a guard coupled to the frame, and the guard defines a plurality of openings spaced laterally across the valve airflow pathway. Additionally or alternatively, the guard is positioned towards the first end of the valve assembly.

Some embodiments of the technology disclosed herein relate to a pressure relief assembly having a first axial end, a second axial end, and a valve airflow pathway extending from the first axial end through the second axial end through the valve opening. A frame has a coupling structure, a valve mounting surface, and a valve opening within the valve mounting surface. A valve body is sealably disposed on the valve mounting surface across the valve opening, whereby the valve airflow pathway is obstructed. A first spring-loaded detent releasably secures the valve body to the frame, where the first spring-loaded detent is configured to release the valve body from the valve frame upon a minimum pressure differential across the valve opening. The valve body is configured to be clear of the valve airflow pathway upon the minimum pressure differential across the valve opening.

In some such embodiments the first spring-loaded detent extends laterally from the frame to the valve body. Additionally or alternatively, a valve stem extends in an axial direction from the valve body, and the first detent extends laterally from the frame to the valve stem. Additionally or alternatively, the pressure relief assembly has a plurality of spring-loaded detents including the first spring-loaded detent. Each of the plurality of spring-loaded detents releasably secures the valve body to the frame. Each of the plurality of spring-loaded detents extend laterally from the frame to the valve body. Each spring-loaded detent is configured to release the valve body upon the minimum pressure differential across the valve opening. Additionally or alternatively, the pressure relief assembly has a vent, where the frame further has a vent mounting surface and a vent opening within the vent mounting surface. The vent opening is functionally parallel to the valve opening, and the vent is coupled to the vent mounting surface across the vent opening. Additionally or alternatively, the pressure relief assembly has a vent, and the valve body has a vent mounting surface and a vent opening within the vent mounting surface, where the vent opening is functionally parallel to the valve opening. The vent is coupled to the vent mounting surface across the vent opening. Additionally or alternatively, the valve has a valve sidewall around the vent opening and the frame has a frame sidewall around the valve opening, where the frame sidewall is spaced radially outward from the valve sidewall.

Additionally or alternatively, a vent cover extends laterally across the vent. Additionally or alternatively, the vent is positioned axially between the frame and the vent cover. Additionally or alternatively, wherein the vent cover and the valve body are a single, unitary component. Additionally or alternatively, an environmental opening is defined perpendicular to the vent cover. Additionally or alternatively, the environmental opening is positioned axially between the vent cover and the vent. Additionally or alternatively, the environmental opening is defined by the vent cover. Additionally or alternatively, the vent opening is geometrically parallel to the valve opening. Additionally or alternatively, the vent opening is geometrically non-parallel to the valve opening.

Additionally or alternatively, the vent is a breathable membrane. Additionally or alternatively, a hinge pivotably couples the valve body to the frame. Additionally or alternatively, the hinge is positioned oppositely of the first detent relative to the valve body in the lateral direction. Additionally or alternatively, the first spring-loaded detent has a detent housing having a first end and a second end. A compression spring is disposed in the detent housing. The compression spring extends from the first end towards the second end. A detent engagement surface is translatably disposed in the detent housing. The compression spring is compressibly disposed between the detent engagement surface and the first end of the detent housing. Additionally or alternatively, the valve body has a circular profile in the lateral direction. Additionally or alternatively, the assembly has a guard coupled to the frame, and the guard defines a plurality of openings spaced laterally across the valve airflow pathway. Additionally or alternatively, the guard is positioned towards the first end of the valve assembly.

Some embodiments of the technology disclosed herein relate to a pressure relief assembly having a frame having a coupling structure, a valve mounting surface, and a valve opening within the valve mounting surface. A valve body is sealably disposed on the valve mounting surface across the valve opening. A first spring-loaded detent releasably secures the valve body to the frame, where the first spring-loaded detent is configured to release the valve body from the valve frame upon a minimum pressure differential across the valve opening. The first spring-loaded detent has a detent housing having a first end and a second end. A compression spring is disposed in the detent housing, where the compression spring extends from the first end towards the second end. A detent engagement surface is translatably disposed in the detent housing. The compression spring is compressibly disposed between the detent engagement surface and the first end of the detent housing.

In some such embodiments, the frame has a vent mounting surface and a vent opening within the vent mounting surface. The vent opening is functionally parallel to the valve opening. The pressure relief assembly also has a vent coupled to the vent mounting surface across the vent opening. Additionally or alternatively, the pressure relief assembly has a vent, and the valve body has a vent mounting surface and a vent opening within the vent mounting surface, where the vent opening is functionally parallel to the valve opening. The vent is coupled to the vent mounting surface across the vent opening.

Additionally or alternatively, the vent opening is geometrically parallel to the valve opening. Additionally or alternatively, the vent opening is geometrically non-parallel to the valve opening.

Additionally or alternatively, a vent cover extends laterally across the vent, where the vent is positioned axially between the frame and the vent cover. Additionally or alternatively, the vent cover and the valve body are a single, unitary component. Additionally or alternatively, an environmental opening is defined perpendicular to the vent cover. Additionally or alternatively, the environmental opening is positioned axially between the vent cover and the vent. Additionally or alternatively, the environmental opening is defined by the vent cover. Additionally or alternatively, the vent is a breathable membrane. Additionally or alternatively, the valve body has a circular profile in the lateral direction. Additionally or alternatively, the first spring-loaded detent extends laterally from the frame to the valve body. Additionally or alternatively, a valve stem extends in an axial direction from the valve body, and the first spring-loaded detent extends laterally from the frame to the valve stem.

Additionally or alternatively, the assembly has a second spring-loaded detent releasably securing the valve body to the frame. Additionally or alternatively, the second spring-loaded detent extends laterally from the frame to the valve body. The second spring-loaded detent is configured to release the valve body from the valve frame upon the minimum pressure differential across the valve opening. Additionally or alternatively, a hinge pivotably couples the valve body to the frame. Additionally or alternatively, the hinge is positioned oppositely of the first spring-loaded detent relative to the valve body in the lateral direction. Additionally or alternatively, the valve has a valve sidewall around the vent opening and the frame has a frame sidewall around the valve opening, where the frame sidewall is spaced radially outward from the valve sidewall. Additionally or alternatively, the assembly has a guard coupled to the frame, and the guard defines a plurality of openings spaced laterally across the valve airflow pathway. Additionally or alternatively, the guard is positioned towards the first end of the valve assembly.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE DRAWINGS

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Pressure relief assemblies consistent with the technology disclosed herein are generally configured to provide pressure relief to an enclosure when the pressure within the enclosure exceeds a minimum pressure differential relative to an environment outside of the enclosure. The pressure relief assembly is generally configured to be coupled to the enclosure, where the enclosure is generally not a component of the pressure relief assembly. The pressure relief assembly can be configured to facilitate selective pressure equalization of the enclosure while preventing the entry of contaminants, such as particles and liquids (such as water), into the enclosure. The enclosure is generally configured to house system components such as electronic components and battery cells, as examples. In some examples, the enclosure is a battery housing.

Some embodiments of the technology disclosed herein may advantageously allow re-use of the pressure relief assembly after release of the pressure relief valve. In particular, detents that can be used to release the pressure relief valve may be configured to be deployed multiple times without mechanical/physical degradation, which allows for a predictable minimum pressure differential to trigger deployment of the valve. The reusability of the pressure relief assembly may advantageously allow performance testing of every component prior to use by an end customer, for example. The reusability of the pressure relief assembly may advantageously allow re-use by an end customer, as another example.

Figure 1:
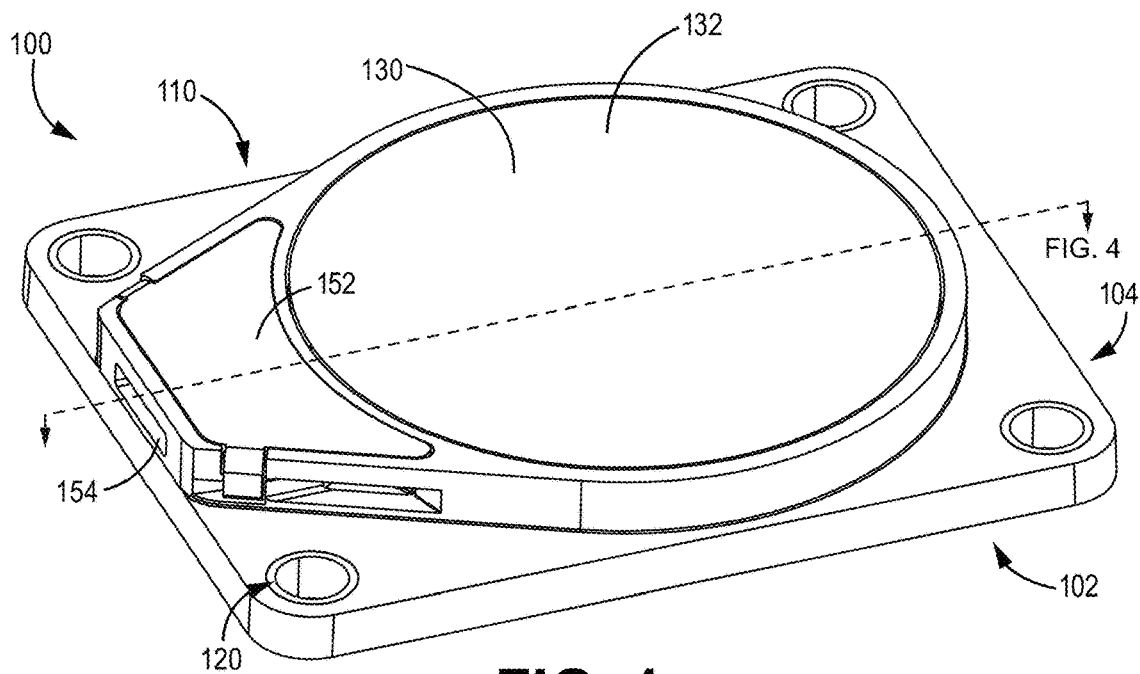
FIG. 1 is a perspective view of an example pressure relief assembly consistent with the technology disclosed herein.
Figure 2:
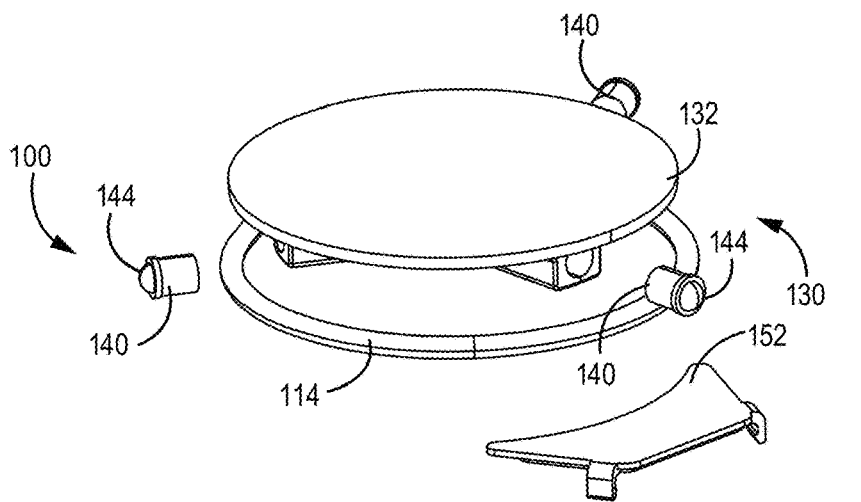
FIG. 2 is an exploded view from a first perspective of the example pressure relief assembly of FIG. 1.
Figure 2:
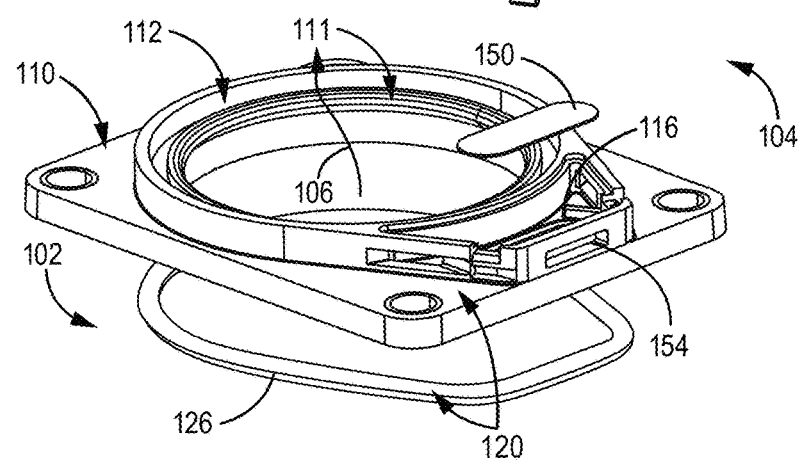
Figure 3:
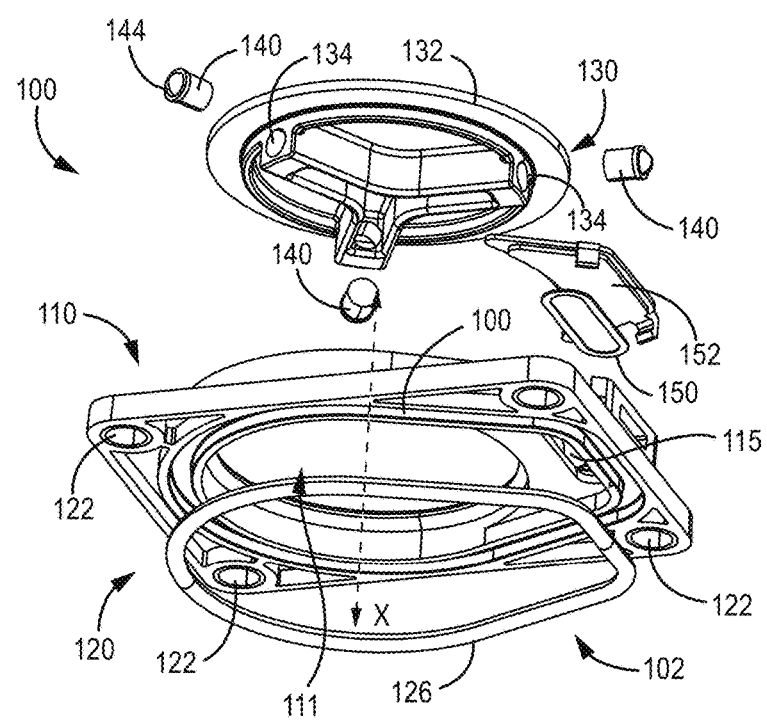
FIG. 3 is an exploded view from a second perspective of the example pressure relief assembly of FIG. 1.
Figure 4:
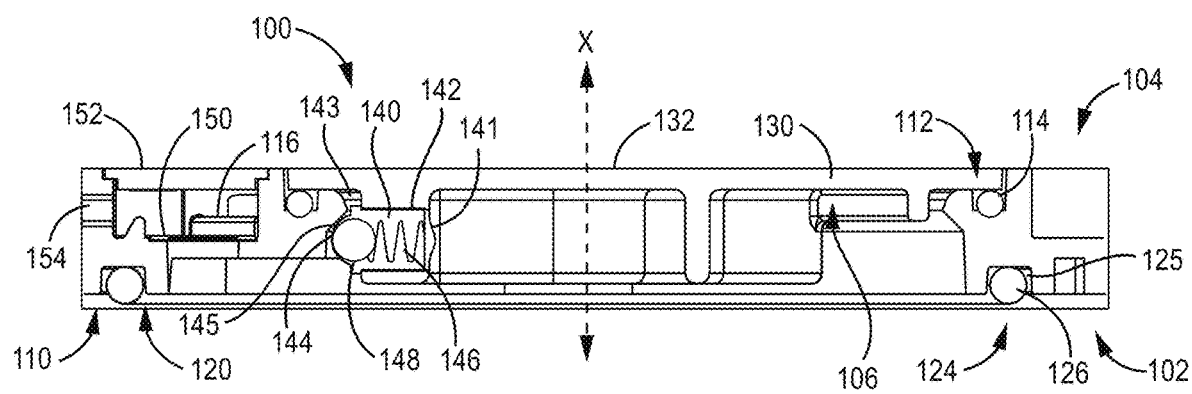
FIG. 4 is a cross-sectional view of the example pressure relief assembly of FIG. 1.

FIGS. 1-4 depict one example pressure relief assembly 100 consistent with the technology disclosed herein, which can be viewed together in conjunction with the following description. FIG. 1 is a perspective view of the example pressure relief assembly 100, FIG. 2 is an exploded first view of the example pressure relief assembly 100, FIG. 3 is an exploded second view of the example pressure relief assembly 100, and FIG. 4 is a cross-sectional view of the example pressure relief assembly 100 denoted in FIG. 1.

The pressure relief assembly 100 is generally configured to be coupled to an enclosure about an opening in the enclosure. The pressure relief assembly 100 generally has a first axial end 102, a second axial end 104, and a valve airflow pathway 106 extending from the first axial end 102 through the second axial end 104. The valve airflow pathway 106 is selectively obstructed by a valve 130, where the valve 130 is configured to relieve pressure when the pressure within the enclosure exceeds a minimum pressure differential relative to the environment outside of the enclosure.

The pressure relief assembly 100 generally has a frame 110 and a valve 130 coupled to the frame 110. The frame 110 is generally configured to support one or more components of the pressure relief assembly 100. The frame 110 has a coupling structure 120, a valve mounting surface 112, and a valve opening 111 within the valve mounting surface 112. The valve airflow pathway 106 selectively extends through the valve opening 111.

The coupling structure 120 is generally configured to sealably couple to an enclosure about an enclosure opening, which is not currently depicted. The coupling structure 120 is generally configured to engage the enclosure. In the current example, the coupling structure 120 has a plurality of fastener receptacles 122 that are each configured to receive a fastener that fastens the pressure relief assembly 100 to the enclosure. Example fasteners include screws, bolts, pins, and the like. In some embodiments, the coupling structure 120 is defined towards the second axial end 104 of the pressure relief assembly 100.

In some other embodiments, the coupling structure can form a snap-fit connection with the enclosure. In some other embodiments, the coupling structure forms a mating structure that is configured to mate with a corresponding structure defined by the casing. For example, the coupling structure can define a screw thread configured to be engaged by the enclosure about the enclosure opening. As another example, the coupling structure can define a connector that interlocks with the enclosure about the enclosure opening, such as a bayonet connector. In some embodiments, the coupling structure can be coupled to the enclosure around the enclosure opening with an adhesive.

In embodiments consistent with the current example, the pressure relief assembly 100 has a sealing region 124 (best visible in FIG. 4). The sealing region 124 is configured to create a seal between the pressure relief assembly 100 and the enclosure when the pressure relief assembly 100 is coupled to the enclosure. The sealing region 124 generally surrounds a portion of the valve airflow pathway. The sealing region 124 surrounds the valve opening 111 in the example currently depicted. In some embodiments, the sealing region 124 surrounds the coupling structure 120. The sealing region 124 can include an elastomeric material configured to make contact with the enclosure. The sealing region 124 can be defined by the frame 110 itself or it can be a separate component, such as a seal 126. In the current example, the sealing region 124 includes a circumferential groove 125 that is configured to receive a seal 126. In some embodiments the sealing region 124 has the seal 126 that is a loop of rubber or another gasketing or sealing material.

The valve mounting surface 112 is generally configured to sealably receive the valve 130 around the valve opening 111. The valve 130 selectively obstructs the valve airflow pathway 106. In the current example, the valve mounting surface 112 includes a sealing component 114 that is configured to form a seal with a valve body 132 of the valve 130. In some other embodiments, the valve body 132 has the sealing component 114 that is configured to form a seal with the valve mounting surface 112. The sealing component 114 can be an o-ring, for example, or another loop of elastomeric material.

The valve 130 is generally configured to accommodate pressure release from an enclosure to which the pressure relief assembly 100 is coupled. The valve 130 is generally configured to accommodate pressure release from the first axial end 102 to the second axial end 104 through the frame 110. The valve 130 has a valve body 132 sealably disposed on the valve mounting surface 112 across the valve opening 111. As such, the valve airflow pathway 106 is obstructed by the valve body 132. The valve body 132 can be constructed of a variety of materials and combinations of materials including plastic, metal, wood, and the like. The valve body 132 is generally non-breathable and liquid impermeable. Non-breathable is used here to mean that there is no measurable airflow through the valve body 132 at room temperature with at least 20 mbar pressure differential across the valve body 132.

The valve body 132 can have a variety of different shapes, but in the current embodiment the valve body 132 has a circular profile in the lateral direction, where the "lateral direction" is the direction of the plane perpendicular to the axial direction, and the axial direction is the direction of an axis x (FIG. 4) extending between the first axial end 102 to the second axial end 104. In some embodiments the valve body 132 can have a lateral profile that is a polygonal shape such as rectangular, hexagonal, or the like.

The valve 130 also has at least a first detent 140 that releasably secures the valve body 132 to the frame 110. The first detent 140 is configured to release the valve body 132 from the frame 110 upon a minimum pressure differential across the valve opening 111. In the current example, the valve 130 has a plurality of detents 140 including the first detent that releasably secures the valve body 132 to the frame 110. A detent is defined herein as a mechanical or magnetic structure that secures a first part to a second part and releases the first part from the second part upon a particular release force being applied to the first part. In accordance with the technology disclosed herein, the "first part" is generally the valve body 132, and the release force that is generally applied to the valve body 132 is the pressure differential between the enclosure and the environment outside of the enclosure.

The detent(s) 140 can have a variety of configurations. In the current example, each of the detents 140 is a spring-loaded detent. A spring-loaded detent is a detent that employs a compression spring to secure the valve 130 to the frame 110 and the spring force is overcome by the release force to release the valve 130 from the frame 110. Each detent 140 extends laterally from the frame 110 to the valve body 132. In the current example, each detent 140 is fixed to the valve body 132 and each detent 140 frictionally engages the frame 110, although the reverse configuration is also possible where each detent 140 is fixed to the frame 110 and frictionally engages the valve body 132. Furthermore, other types of engagement are possible such as magnetic engagement.

In various embodiments, each detent 140 of the plurality of detents has an identical structure. In the current example, which is best visible in FIG. 4, each detent 140 has a detent housing 142 having a first end 141 and a second end 143. The second end 143 is generally open, and a detent engagement surface 144 protrudes from the second end 143 of the detent housing 142 to frictionally engage a mating surface 145 the frame 110 (or the valve body 132 in a reverse orientation). A compression spring 146 is disposed in the detent housing 142, extending from the first end 141 towards the second end 143. The compression spring 146 is compressed between the first end 141 of the detent housing 142 and the detent engagement surface 144. The compression spring 146 biases the detent engagement surface 144 outward. The detent engagement surface 144 is translatably disposed in the detent housing 142. The compression spring 146 can be a helical coil constructed of metal or plastic, in some embodiments. The compression spring 146 can also be multiple coils, in some embodiments.

When the pressure in an enclosure increases to attain a minimum pressure differential between the enclosure and the outside environment, the force between the frame 110 and the detent engagement surface 144 increases until the biasing force of the compression spring 146 is overcome, causing lateral translation of the detent engagement surface 144 against the compression spring 146, towards the first end of the detent housing 142. The pressure differential between the enclosure and the outside environment results in a force that pushes the valve body 132 out from the valve opening 111, which is unopposed by the detent 140.

There are various factors that help define the minimum pressure differential that removes the valve body 132 from the valve opening 111. The area of the lateral profile of the valve opening 111, the biasing force of the detents 140, the number of detents 140, the contact angle between the detent engagement surface 144 and the frame 110, the curvature of the detent engagement surface 144 are all example factors that contribute to defining the minimum pressure differential that removes the valve body 132 from the valve opening 111. The minimum pressure differential is not particularly limited, but in some embodiments the minimum pressure differential ranges from 40 mbar (0.58 psi) to 100 mbar (1.45 psi), 50 mbar (0.73 psi) to 90 mbar (1.3 psi), or 60 mbar (0.87 psi) to 80 mbar (1.16 psi). In one particular example the minimum pressure differential ranges from 65 mbar (0.94 psi) to 75 mbar (1.09 psi). However other ranges are certainly contemplated.

The valve body 132 is generally configured to be clear of the valve airflow pathway 106 upon the minimum pressure differential across the valve opening 111, where being "clear" of the valve airflow pathway 106 means that at least 85%, 90%, 95%, or 97% of the lateral area of the valve opening does not overlap with the lateral area of valve body 132 in the axial direction. In some embodiments, there is no overlap between the lateral area of the valve body 132 and 100% of the lateral area of valve opening in the axial direction. Such a configuration may advantageously maximize pressure release from the enclosure to the outside environment. In some such embodiments, the valve body 132 is configured to be ejected from the frame 110 upon the minimum pressure differential across the valve opening 111. In some embodiments, a tether can couple the valve body 132 to the frame 110 such that the valve body 132 remains in proximity of the frame 110 after detachment from the frame 110.

In the current example, the detent engagement surface 144 is defined by a detent ball 148 (FIG. 4) disposed in the detent housing 142. The detent ball 148 can be a sphere rotatably disposed in the detent housing 142 to facilitate release of the valve body 132 by the frame 110. In some other embodiments the detent engagement surface can be defined by a differently-shaped component, such as an ovoid or a cylindrical component with a rounded, convex end forming the detent engagement surface 144. In some other embodiments, the detent engagement surface is concave.

The detents 140 can have alternate configurations, as will be appreciated. In some embodiments the detent(s) is not a spring-loaded detent. For example, the detent can be a protrusion extending laterally outward from the valve body 132 or laterally inward from the frame 110 to engage a corresponding engaging surface of the other of the frame 110 or the valve body 132. In some embodiments each detent is a magnet that secures the valve body 132 to the frame 110.

In the current example the detents 140 are fixed to the valve body 132. More particularly, the valve body 132 defines lateral detent openings 134 (visible in FIG. 3). In this example, the detent openings 134 extend radially outward from the central axis x and are equally spaced around the central axis. Each detent opening 134 is configured to receive and engage a detent housing 142. In particular, the first end 141 of each detent housing 142 is inserted into a detent opening 134. The second end 143 of the detent housing 142 can be positioned outside of the detent opening 134 or inside of the detent opening 134. The detent engagement surface 144 generally is positioned outside of the detent opening 134.

In some other embodiments, the valve 130 can have a valve stem extending axially outward from the valve body 132. In such an example, the detent can extend laterally from the frame to the valve stem to releasably secure the valve body 132 to the valve mounting surface 112. Such examples are discussed below with reference to FIGS. 11-14.

Some embodiments of the technology disclosed herein may advantageously allow re-use of the pressure relief assembly 100 after release of the valve body 132 from the frame 110. In particular, detents 140 such as spring-loaded detents or magnets, as examples, may be configured to be deployed multiple times without mechanical/physical degradation, which allows for a predictable minimum pressure differential to trigger deployment of the valve body 132. The reusability of the pressure relief assembly 100 may advantageously allow performance testing of every component prior to use by an end customer, for example. The reusability of the pressure relief assembly 100 may advantageously allow re-use by an end customer, as another example.

In some examples of the technology disclosed herein, including the one depicted, the pressure relief assembly 100 has a vent 150, where the term "vent" is used to refer to a component constructed of a breathable material that is configured to facilitate passive airflow. In some such embodiments, the vent 150 allows for venting of an enclosure during normal operation conditions. In embodiments where a vent 150 is incorporated in the pressure relief assembly 100, the frame 110 defines a vent mounting surface 116 and a vent opening 115 (particularly visible in FIG. 3) within the vent mounting surface 116. The vent opening 115 is functionally parallel to the valve opening 111, meaning that the vent opening 115 and the valve opening 111 are arranged in parallel with respect to airflow through the pressure relief assembly 100. The vent opening 115 can also be arranged to be geometrically parallel to the valve opening 111, in some embodiments. In some other embodiments the vent opening 115 is geometrically non-parallel to the valve opening 111, such as where the vent opening 115 is at an angle relative to the valve opening 111, which will be discussed in more detail below.

The vent 150 is coupled to the vent mounting surface 116 across the vent opening 115. The vent 150 is generally configured to prevent the ingress of outside contaminants to the first axial end 102 from the second axial end 104 through the vent opening 115. The vent 150 is functionally parallel to the valve 130 relative to airflow through the pressure relief assembly 100. In various embodiments, the pressure relief assembly 100 lacks a vent in parallel with the valve 130, whether functionally parallel or geometrically parallel. In some embodiments, the vent 150 is arranged in series with an inlet relief valve with respect to airflow through the pressure relief assembly 100, which will be discussed in more detail below.

The vent 150 is generally positioned in fluid communication with the enclosure. The vent 150 is configured to allow gases to pass between the enclosure and the environment outside of the enclosure by flowing through vent 150. In some embodiments, the vent 150 is configured to prevent particles from entering into the enclosure. In some embodiments, the vent 150 is also configured to prevent liquids from entering into the enclosure.

The vent 150 can be constructed of a variety of different materials and combinations of materials. In some embodiments the vent 150 is a passive airflow vent, meaning that the vent 150 is configured to passively allow airflow therethrough. In various embodiments the vent 150 incorporates a breathable membrane. Breathable membranes include, for example, polyethersulfone (PES), nylon, cellulose acetate, polyvinylidene difluoride (PVDF), polyamide, polycarbonate, and acrylic. In various embodiments the breathable membrane is constructed of porous polytetrafluoroethylene (PTFE). Porous PTFE can be produced through a variety of approaches and combinations of approaches generally known in the art. The vent 150 can be a laminate or composite that includes a breathable membrane, such as a PTFE membrane laminated to a woven or non-woven support layer. In some embodiments, the vent 150 is a woven fabric or a non-woven fabric. The vent 150 can be constructed of hydrophobic material, or the vent 150 can be treated to exhibit hydrophobic properties. In one example, the vent 150 is a hydrophobic woven or non-woven fabric. The vent 150 can be constructed of an oleophobic material, or the vent 150 can be treated to exhibit oleophobic properties. In one example, the vent 150 is an oleophobic woven or non-woven fabric. In some embodiments the vent 150 has a support ring to support the periphery of the venting material. The vent 150 can be coupled to the frame 110 with adhesive or through a weld area, in examples.

The pressure relief assembly 100 has a vent cover 152 extending laterally across the vent 150 such that the vent 150 is positioned in the axial direction between the frame 110 and the vent cover 152. The vent cover 152 is generally spaced in the axial direction from the vent 150. The vent cover 152 can be a separate component that is fixed to the frame 110, in some embodiments. In some other embodiments, the vent cover 152 is a single, cohesive component with the frame 110. The vent cover 152 may advantageously protect the vent 150 from direct impact of environmental contaminants such as liquid spray and debris. As is best visible in FIGS. 1 and 2, an environmental opening 154 can be defined between the vent cover 152 and the vent 150 that is configured to define a vent airflow pathway between the vent 150 and the external environment. The environmental opening 154 can be perpendicular to the vent 150. The environmental opening 154 can be positioned axially between the vent cover 152 and the vent 150. Such a configuration may advantageously limit the direct impact of the vent 150 by environmental contaminants. While in the current example the vent cover 152 and the valve body 132 are separate components, it is noted that, in some embodiments the vent cover 152 and the valve body 132 can be a single, cohesive component. In some embodiments, the assembly 100 lacks a vent cover, such as where the assembly 100 is configured for installation in operating environments where the vent 150 is configured to be relatively protected from impact with environmental contaminants such as water spray and debris.

Figure 5:
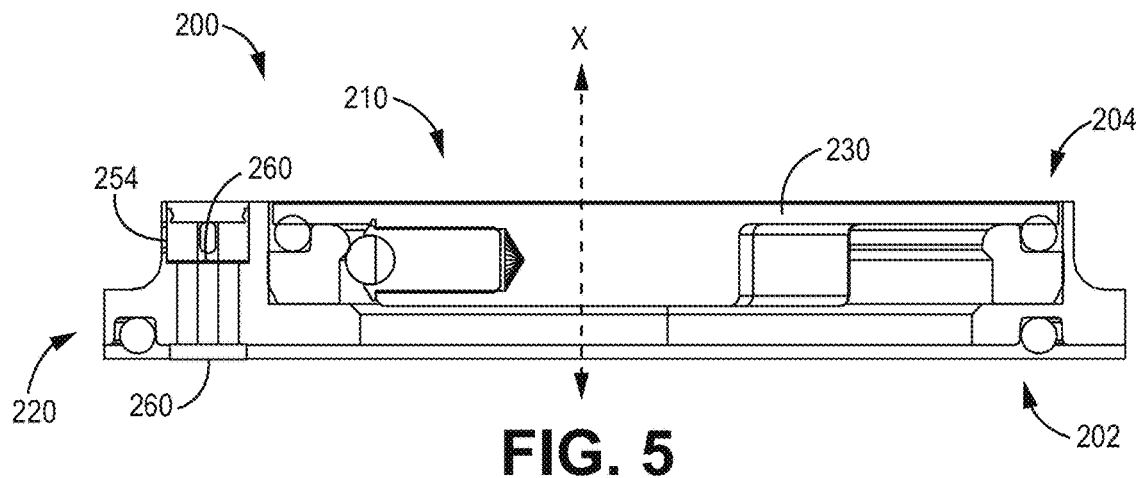
FIG. 5 is a cross-sectional view of another example pressure relief assembly consistent with the technology disclosed herein.

In some embodiments the vent 150 can be arranged in series with a second valve that is oppositely oriented relative to the valve 130 discussed in detail above (which can be referred to as the first valve. In various embodiments the first valve is an outlet relief valve. The second valve can be an inlet relief valve. Such an example is depicted in FIG. 5, which is a cross-sectional view of an example pressure relief assembly 200 that is generally consistent with the pressure relief assembly of FIGS. 1-4 and the corresponding discussion except where noted herein. A vent 250 can be positioned between an inlet relief valve 260 and the environmental opening 254. In examples, the pressure relief assembly lacks a vent in a series with the outlet relief valve.

The inlet relief valve 260 is generally configured to accommodate pressure release from the second axial end 202 to the first axial end 204 through the pressure relief assembly 200. The inlet relief valve 260 is generally configured to accommodate pressure release from an outside environment to the enclosure to which the pressure relief assembly 200 is coupled.

The vent 250 is generally configured to prevent the ingress of outside contaminants to the first axial end 202 from the second axial end 204 through the inlet relief valve 260, particularly when the inlet relief valve 260 is unsealed from the frame 210. The vent 250 is functionally parallel with the outlet relief valve 230 relative to airflow through the pressure relief assembly 200. The vent 250 is arranged in series with the inlet relief valve 260 with respect to airflow through the pressure relief assembly 200. The vent 250 is generally consistent with the discussions of the vent elsewhere herein. In various embodiments, the pressure relief assembly 200 lacks a vent in series with the outlet relief valve 230.

Figure 6:
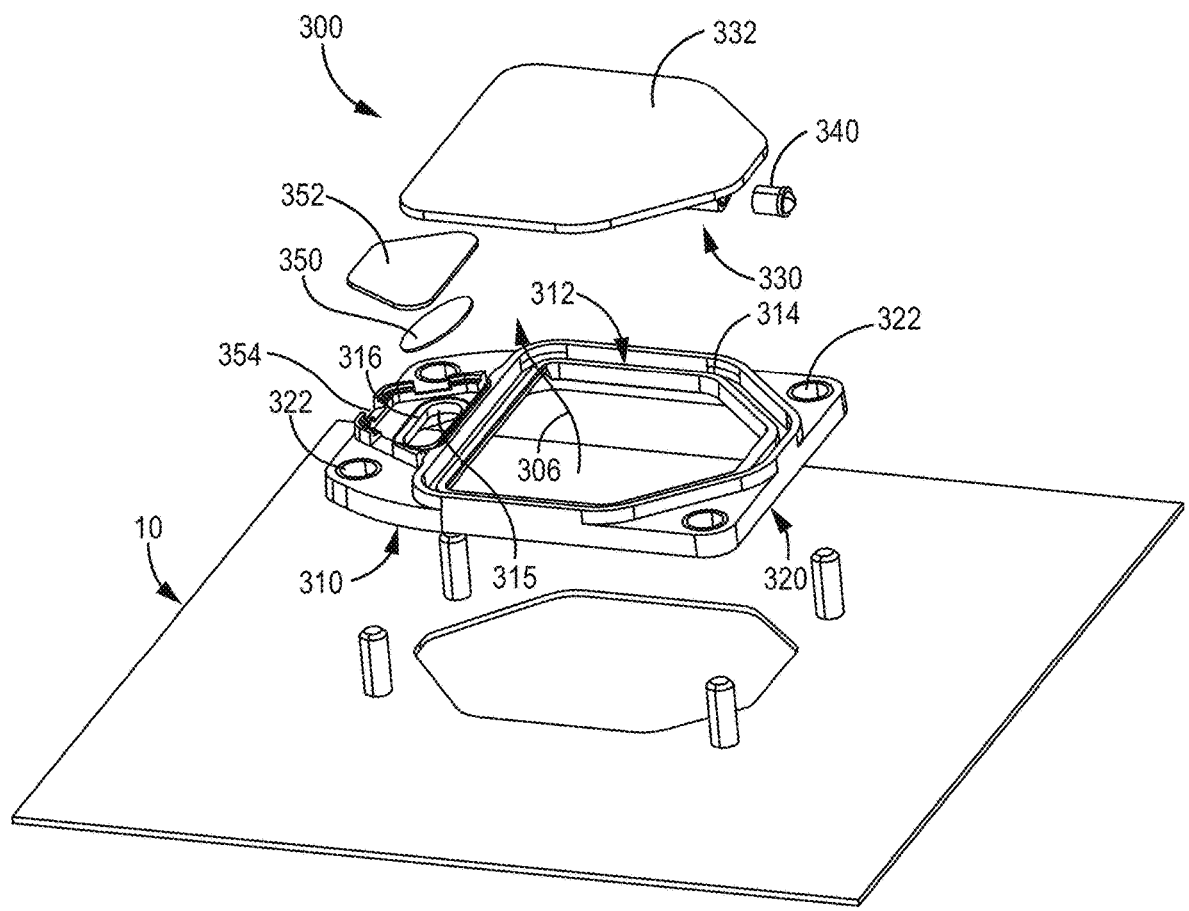
FIG. 6 is an exploded view of yet another example pressure relief assembly consistent with the technology disclosed herein.
Figure 7:
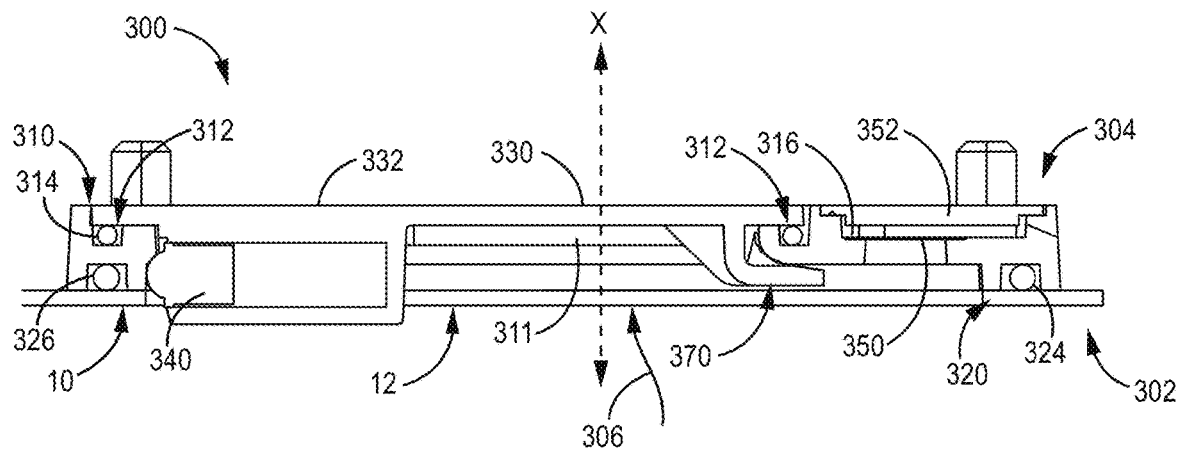
FIG. 7 is a cross-sectional view of the example pressure relief assembly of FIG. 6.

FIGS. 6 and 7 depict another example of a pressure relief assembly 300 consistent with the technology disclosed herein. FIG. 6 is an exploded perspective view of the pressure relief assembly 300 and FIG. 7 is a cross-sectional view. The present figures also depict an example enclosure 10, which the pressure relief assembly 300 is configured to be coupled to. As with the examples discussed above, the pressure relief assembly 300 is generally configured to be coupled to the enclosure 10 about an enclosure opening 12. The pressure relief assembly 300 generally has a first axial end 302, a second axial end 304, and a valve airflow pathway 306 extending from the first axial end 302 through the second axial end 304. The valve airflow pathway 306 is selectively obstructed by a valve 330, where the valve 330 is configured to relieve pressure when the pressure within the enclosure relative to the outside environment exceeds a minimum pressure differential.

The pressure relief assembly 300 has a frame 310 and the valve 330 is coupled to the frame 310. The frame 310 is generally configured to support one or more components of the pressure relief assembly 300. The frame 310 has a coupling structure 320, a valve mounting surface 312, and a valve opening 311 within the valve mounting surface 312. The valve airflow pathway 306 selectively extends through the valve opening 311. In the current example, the frame 310 also defines a vent mounting surface 316 and a vent opening 315 within the vent mounting surface 316. The vent opening 315 is functionally parallel to the valve opening 311. Here the vent opening 315 is also geometrically parallel to the valve opening 311. Other configurations are possible, which will be discussed further herein.

A vent 350 is coupled to the vent mounting surface 316 across the vent opening 315. The vent 350 is functionally parallel to the valve 330 relative to airflow through the pressure relief assembly 300. In some embodiments, the pressure relief assembly 300 lacks a vent, however. In some embodiments, the vent 350 is arranged in series with an inlet relief valve with respect to airflow through the pressure relief assembly 300, which has been discussed above with reference to FIG. 5.

The vent 350 is positioned in fluid communication with the inside of the enclosure 10. The vent 350 is configured to allow gases to pass between inside the enclosure 10 and the environment outside of the enclosure 10 by flowing through vent 350. The vent 350 can be consistent with discussions of vents earlier herein. The pressure relief assembly 300 has a vent cover 352 extending laterally across the vent 350 such that the vent 350 is positioned in the axial direction between the frame 310 and the vent cover 352. The vent cover 352 is generally spaced in the axial direction from the vent 350. The vent cover 352 can be consistent with vent covers discussed above. An environmental opening 354 can be defined between the vent cover 352 and the vent 350 that is configured to define a vent airflow pathway between the vent 350 and the external environment. The environmental opening 354 can be perpendicular to the vent 350. The environmental opening 354 can be positioned axially between the vent cover 352 and the vent 350.

The coupling structure 320 is generally configured to sealably couple to an enclosure about an enclosure opening. The coupling structure 320 is generally configured to engage the enclosure. In the current example, the coupling structure 320 has a plurality of fastener receptacles 322 that are each configured to receive a fastener that fastens the pressure relief assembly 300 to the enclosure. In some embodiments, the coupling structure 320 is defined towards the first axial end 302 of the pressure relief assembly 300. The coupling structure 320 can include a sealing region 324 configured to accommodate a seal, such as a sealing loop 326, between the pressure relief assembly 300 and the enclosure when the pressure relief assembly 300 is coupled to the enclosure. The sealing region 324 can surround the valve opening 311, such as in the example currently depicted. The sealing region 324 surrounds the valve airflow pathway 306. In the current example, the sealing region 324 surrounds the valve opening 311 and the vent opening 315. The coupling structure 320, including the sealing region(s) 324 can have configurations and alternate configurations that have been described above.

The valve mounting surface 312 is generally configured to sealably receive the valve 330 around the valve opening 311. The valve 330 selectively obstructs a valve airflow pathway 306. In the current example, the valve mounting surface 312 includes a sealing component 314 (FIG. 7) that is configured to form a seal with the valve 330. In some other embodiments, the valve 330 itself can include the sealing component 314 that is configured to form a seal with the valve mounting surface 312.

The valve 330 is generally configured to accommodate pressure release from the enclosure 10. The valve 330 is generally configured to accommodate pressure release from the first axial end 302 to the second axial end 304 through the frame 310. The valve 330 has a valve body 332 sealably disposed on the valve mounting surface 312 across the valve opening 311 such that the valve airflow pathway 306 is obstructed by the valve body 332. The valve body 332 can be consistent with valve bodies described in detail above. It is noted that in the current example, however, the valve body 332 has a different profile shape in the lateral direction than in the example of FIGS. 1-4. While the valve body 332 of FIGS. 1-4 has a circular profile shape, here the valve body 332 has a profile shape in the lateral direction that is polygonal.

In the present example, the valve 330 has a first detent 340 that releasably secures the valve body 332 to the frame 310. The first detent 340 is configured to release the valve body 332 from the frame 310 upon a minimum pressure differential across the valve opening 311. In the current example, the valve 330 has a single detent 340. The detent 340 is fixed to a first lateral end of the valve body 332. An engagement surface on the detent 340 frictionally engages the frame, although the reverse configuration is possible where the detent 340 is fixed to the frame and frictionally engages the valve body 332. Furthermore, other forces can engage the frame or the valve body 332, such as magnetic forces. In the current example the detent 340 is a spring-loaded detent, but the detent 340 can have alternate configurations described above. Furthermore, in some embodiments the pressure relief assembly can include additional detents 340 that releasably couple the valve body 332 to the frame.

In the current example, the pressure relief assembly has a hinge 370 that pivotably couples the valve body 332 to the frame. The hinge 370 generally defines the translation path of the valve body 332. The hinge 370 is generally configured to accommodate pivoting of the valve body 332 upon deployment of the detent(s) 340 and the application of pressure on the surface of the valve body 332 in communication with the enclosure, such as the force resulting from a minimum pressure differential across the valve body 332. The valve body 332 is generally pivotable outward relative to the enclosure.

In the current example, the hinge 370 is positioned oppositely of the first detent 340 relative to the valve body 332 in the lateral direction. The hinge 370 is positioned on a second lateral end of the valve body 332 that is opposite the first lateral end of the valve body 332. In the current example, the hinge 370 is mutually defined by reciprocal structures of the frame 310 and the valve body 332, but in other embodiments the hinge 370 can be a separate component that pivotably couples the valve body 332 and the frame 310.

When pressure inside the enclosure spikes above a minimum pressure differential between inside the enclosure and the outside environment, the pressure inside the enclosure pushes against the enclosure side of the valve body 332, which deploys the detent 340 (similar to the discussion above) to release the first lateral end of the valve body 332 from the frame 310. The valve body 332 then pivots in response to the pressure in a direction away from the enclosure to clear the valve airflow pathway 306 and allow pressure equalization between inside the enclosure and the outside environment.

In some embodiments, the valve body 332 is generally configured to be clear of the valve airflow pathway 306 upon the minimum pressure differential across the valve opening 311. Such a configuration may advantageously maximize pressure release from the enclosure to the outside environment. In the current example, however, the valve body 332 is configured to remain coupled to the frame 310 via the hinge 370 upon the minimum pressure differential across the valve opening 311.

Figure 8:
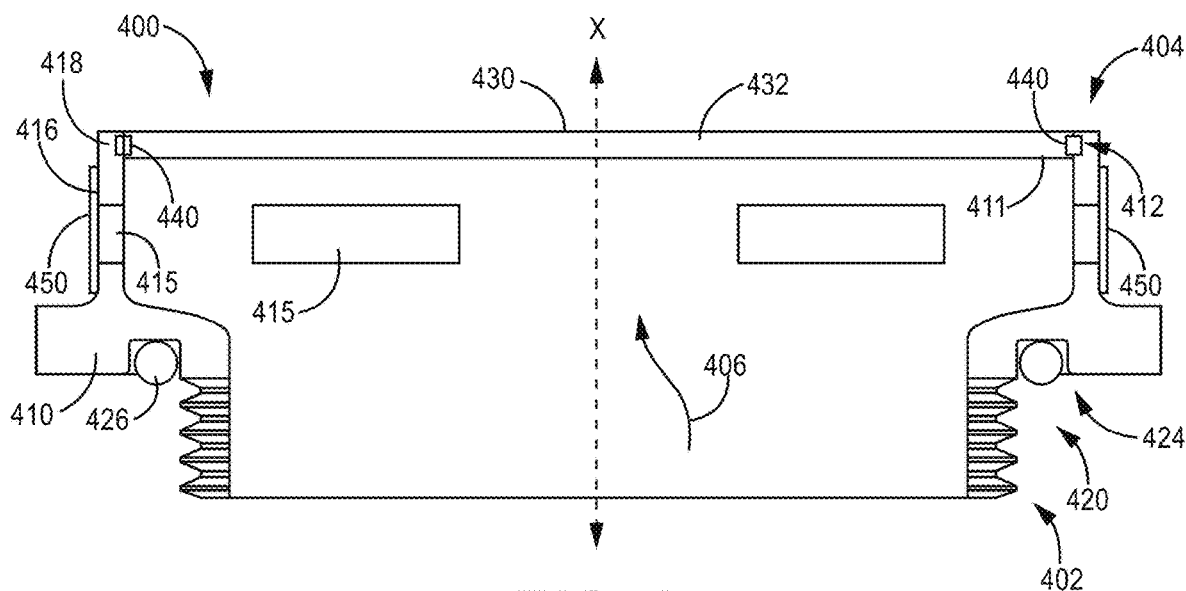
FIG. 8 is a cross-sectional view of yet another pressure relief assembly consistent with the technology disclosed herein.

FIG. 8 is a schematic cross-sectional view of yet another pressure relief assembly 400 consistent with the technology disclosed herein. As with the examples discussed above, the pressure relief assembly 400 is generally configured to be coupled to the enclosure about an opening in the enclosure. The pressure relief assembly 400 generally has a first axial end 402, a second axial end 404, and a valve airflow pathway 406 extending from the first axial end 402 through the second axial end 404. The valve airflow pathway 406 is selectively obstructed by a valve 430, where the valve 430 is configured to relieve pressure when the pressure differential between the inside of the enclosure and the outside environment exceeds a minimum pressure differential.

The pressure relief assembly 400 has a frame 410 and a valve 430 coupled to the frame 410. The frame 410 is generally consistent with frames discussed above. The frame 410 has a coupling structure 420, a valve mounting surface 412, and a valve opening 411 within the valve mounting surface 412. The valve airflow pathway 406 selectively extends through the valve opening 411. In the current example, the frame 410 also defines a vent mounting surface 416 and a vent opening 415 within the vent mounting surface 416. The vent opening 415 is functionally parallel to the valve opening 411. Here, the vent opening 415 is geometrically non-parallel to the valve opening 411. In particular, in this example, the vent opening 415 is also perpendicular to the valve opening 411, although the vent opening 415 can form various different angles with the valve opening 411. In the current example, the frame 410 defines a plurality of vent openings 415, where each vent opening 415 defines a vent mounting surface 416 around the vent opening 415, but in some embodiments the frame defines a single vent opening 415. In some embodiments the vent openings 415 are spaced around an axis x extending in the axial direction. The axis x can be a central axis of the frame in some embodiments.

More particularly, in the current example the frame 410 has a valve sidewall 418 that extends in the axial direction between the first axial end 402 and the second axial end 404. The valve sidewall 418 extends in the axial direction between the coupling structure 420 and the valve 430, and more particularly from the coupling structure 420 to the valve mounting surface 412. The valve sidewall 418 surrounds the valve airflow pathway 406. The valve sidewall 418 defines the one or more vent openings 415. While the valve sidewall 418 is perpendicular to the valve opening 411, in some embodiments the valve sidewall 418 can form a different angle with the valve opening 411.

A vent 450 is coupled to each vent mounting surface 416 across each vent opening 415. The vent 450 is functionally parallel to the valve 430 relative to airflow through the pressure relief assembly 400. In some embodiments, the pressure relief assembly 400 lacks vents, however. In some embodiments, the vents 450 are arranged in series with an inlet relief valve with respect to airflow through the pressure relief assembly 400, which has been discussed above with reference to FIG. 5.

The vent 450 can be consistent with discussions of vents earlier herein. While in the current example, the vents do not have a vent cover extending across each of the vents 450, in some other embodiments a vent cover extends across each of the vents 450. In embodiments incorporating a vent cover, an environmental opening can be defined between the vent cover and the vent 450 that is configured to define a vent airflow pathway between the vent and the external environment. The environmental opening can be perpendicular to the vent 450. The environmental opening can be positioned axially between the vent cover and the vent 450.

The coupling structure 420 is generally configured to sealably couple to an enclosure about an enclosure opening.

The coupling structure 420 is generally configured to engage the enclosure. In the current example, the coupling structure 420 includes a threaded portion extending axially from the frame that is configured to rotatably engage a mating inner circumferential surface of an enclosure about an enclosure opening. In this example, the coupling structure 420 is defined towards the first axial end 402 of the pressure relief assembly 400. The coupling structure 420 includes a sealing region 424 configured to accommodate a sealing loop 426 between the pressure relief assembly 400 and the enclosure when the pressure relief assembly 400 is coupled to the enclosure. The sealing region 424 generally surrounds the valve airflow pathway 406. In the current example, the sealing region 424 surrounds the threaded extension. The coupling structure 420, including the sealing region(s) 424 can have alternative configurations that have been described above.

The valve mounting surface 412 is generally configured to sealably receive the valve 430 around the valve opening 411. In the current example the valve mounting surface 412 is an inner perimetric surface surrounding the valve airflow pathway 406. In some embodiments the valve mounting surface 412 is an inner circumferential surface. The valve 430 selectively obstructs a valve airflow pathway 406 across the valve opening 411. In the current example, the valve mounting surface 412 and the valve body 432 form a seal around the valve opening 411.

The valve 430 is generally configured to accommodate pressure release from the enclosure. The valve 430 is generally configured to accommodate pressure release from the first axial end 402 to the second axial end 404 through the frame 410. The valve body 432 is sealably disposed on the valve mounting surface 412 across the valve opening 411 such that the valve airflow pathway 406 is obstructed by the valve body 432. The valve body 432 can be consistent with valve bodies described in detail above.

In the present example, the valve 430 has a plurality of detents 440 that releasably secure the valve body 432 to the frame 410. The detents are configured to release the valve body 432 from the frame 410 upon a minimum pressure differential across the valve opening 411. The detents 440 are disposed around an outer perimetric surface, such as an outer circumferential surface, of the valve body 432. In the current example each of the detents 440 is a magnetic component that is configured to magnetically engage a magnetic mating surface of the valve mounting surface 412. An engagement surface on each detent 440 magnetically engages the frame. Alternative types of detents can also be used.

In some examples, although not currently visible, a hinge can pivotably couple the valve body 432 to the frame. In such an example the hinge can define the translation path of the valve body 432. The hinge is generally configured to accommodate pivoting of the valve body 432 upon the application of pressure on the surface of the valve body 432 in communication with the enclosure, such as the force resulting from a minimum pressure differential across the valve body 432, and deployment of the detent(s). The valve body 432 is generally pivotable outward relative to the enclosure. In embodiments incorporating a hinge, the hinge can be positioned oppositely of one or more detents 440 relative to the valve body 432 in the lateral direction.

When pressure inside the enclosure spikes above a minimum pressure differential between inside the enclosure and the outside environment, the pressure inside the enclosure pushes against the enclosure side of the valve body 432, which deploys the detent 440 (similar to the discussion above) to decouple the valve body 432 from the valve mounting surface 412. The valve body 432 can either be released from the frame or, in embodiments incorporating a hinge, can pivot in response to the pressure in a direction away from the enclosure to clear the valve airflow pathway 406 and allow pressure equalization between inside the enclosure and the outside environment.

In some embodiments, the valve body 432 is generally configured to be clear of the valve airflow pathway 406 upon the minimum pressure differential across the valve opening 411. Such a configuration may advantageously maximize pressure release from the enclosure to the outside environment. In the current example, however, the valve body 432 is configured to remain coupled to the frame 410 via the hinge despite upon the minimum pressure differential across the valve opening 411.

Figure 9:
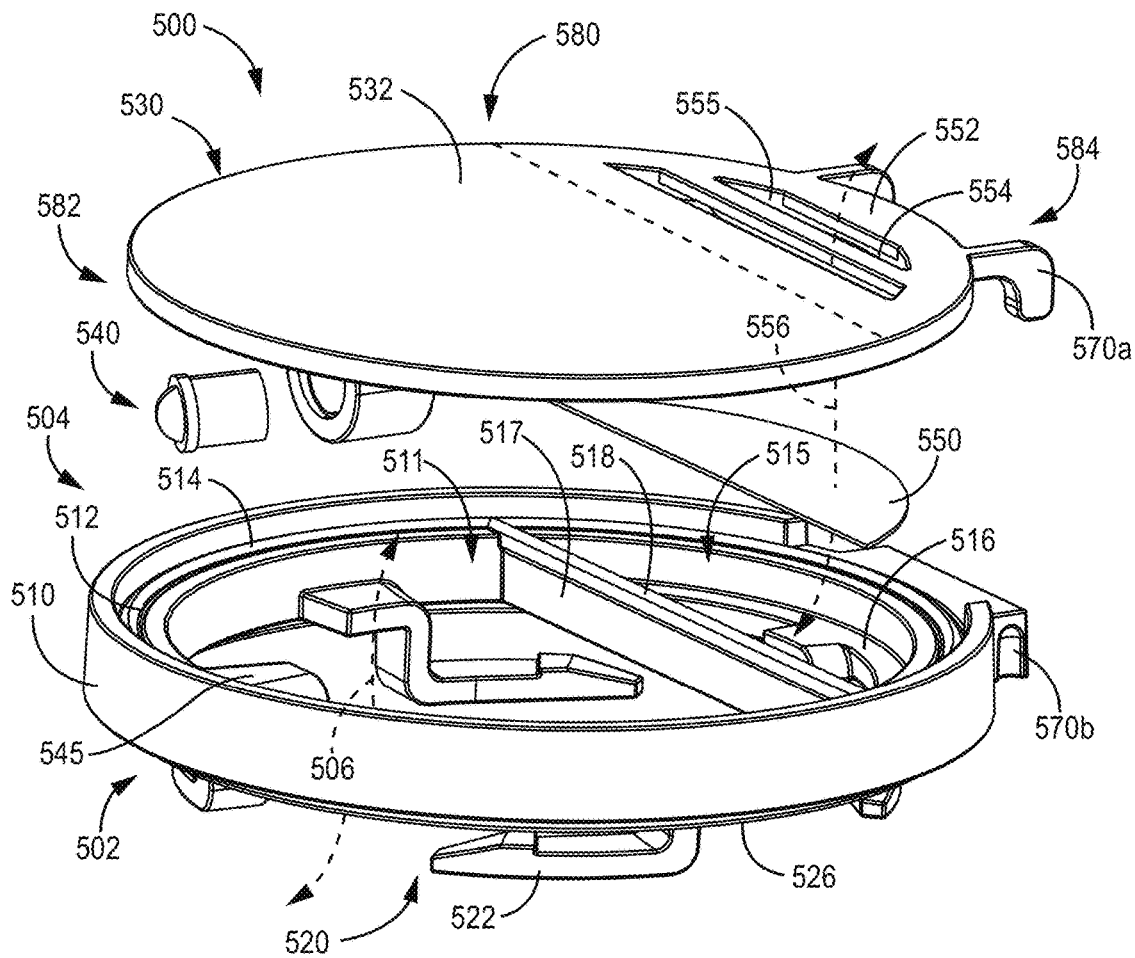
FIG. 9 is an exploded view of yet another example pressure relief assembly consistent with the technology disclosed herein.
Figure 10:
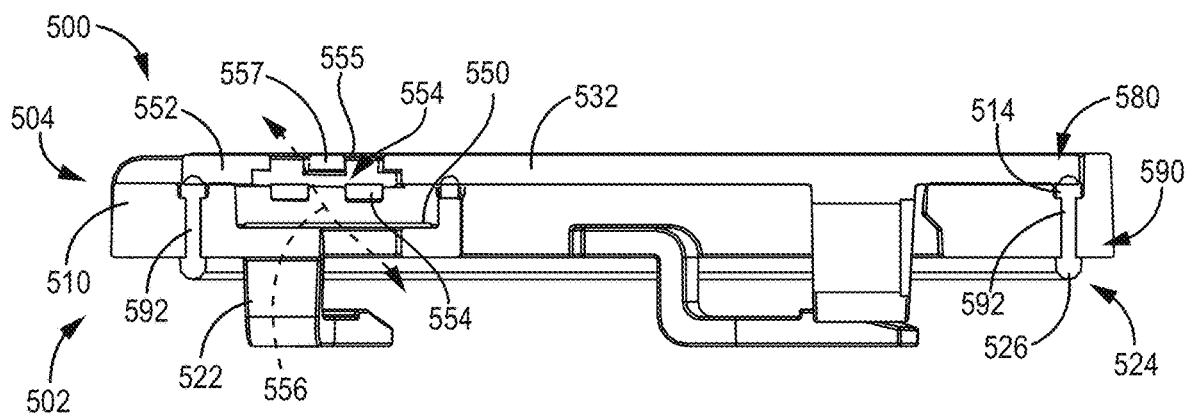
FIG. 10 is a cross-sectional view of a pressure relief assembly consistent with FIG. 9.

FIG. 9 depicts an exploded view of yet another example of a pressure relief assembly 500 consistent with the technology disclosed herein, and FIG. 10 is a cross-sectional view consistent with such a pressure relief assembly 500. As with the examples discussed above, the pressure relief assembly 500 is generally configured to be coupled to the enclosure about an enclosure opening. The pressure relief assembly 500 generally has a first axial end 502, a second axial end 504, and a valve airflow pathway 506 extending from the first axial end 502 through the second axial end 504. The valve airflow pathway 506 is selectively obstructed by a valve 530, where the valve 530 is configured to relieve pressure when the pressure within the enclosure relative to the outside environment exceeds a minimum pressure differential.

The pressure relief assembly 500 has a frame 510 and the valve 530 is coupled to the frame 510. The frame 510 is generally configured to support one or more components of the pressure relief assembly 500. The frame 510 has a coupling structure 520, a valve mounting surface 512, and a valve opening 511 within the valve mounting surface 512. The valve airflow pathway 506 selectively extends through the valve opening 511. In the current example, the frame 510 also defines a vent mounting surface 516 and a vent opening 515 within the vent mounting surface 516. The vent opening 515 is functionally parallel to the valve opening 511. Here the vent opening 515 is also geometrically parallel to the valve opening 511. The frame has a barrier wall 517 that separates the valve opening 511 from the vent opening 515. Other configurations are possible, which have been discussed above.

A vent 550 is coupled to the vent mounting surface 516 across the vent opening 515. The vent 550 is functionally parallel to the valve 530 relative to airflow through the pressure relief assembly 500. In some embodiments, the pressure relief assembly 500 lacks a vent, however. In some embodiments, the vent 550 is arranged in series with an inlet relief valve with respect to airflow through the pressure relief assembly 500, which has been discussed above with reference to FIG. 5.

The vent 550 is configured to define a portion of the vent airflow pathway 556. The vent 550 is configured to allow gases to pass between the first axial end 502 and the second axial end 504 through vent 550. The vent 550 can be consistent with discussions of vents earlier herein. The pressure relief assembly 500 has a vent cover 552 extending laterally across the vent 550 such that the vent 550 is positioned between the frame 510 and the vent cover 552 in the axial direction. The vent cover 552 is generally spaced in the axial direction from the vent 550.

An environmental opening 554 is defined by the vent cover 552 that is configured to define the portion of the vent airflow pathway 556 from the vent 550 to the external environment. In some examples, the environmental opening 554 is non-perpendicular to the vent 550, such as parallel to the vent. In the current example, the environmental opening 554 is perpendicular to the vent. In particular, the vent cover 552 has a "shadowbox configuration," best visible in FIG. 10, where laterally extending inset segments 553 overlap in the axial direction with corresponding laterally extending outer wall openings 555 to create a tortuous flow path through the vent cover 552. In this example, the laterally extending inset segments 553 are axially spaced from a laterally extending outer segment 557. The environmental opening 554 is positioned between the inset segments 553 and the outer segment 557.

The coupling structure 520 is generally configured to sealably couple to an enclosure about an enclosure opening. The coupling structure 520 is generally configured to engage the enclosure. In the current example, the coupling structure 520 has a bayonet connector 522 that is configured to be received by a mating bayonet connector defined by an enclosure. In this example, the coupling structure 520 is defined towards the first axial end 502 of the pressure relief assembly 500. The coupling structure 520 can include a sealing region 524 configured to accommodate a seal, such as a sealing loop 526, between the pressure relief assembly 500 and the enclosure when the pressure relief assembly 500 is coupled to the enclosure. The sealing region 524 can surround the valve opening 511, such as in the example currently depicted. The sealing region 524 surrounds the valve airflow pathway 506. In the current example, the sealing region 524 surrounds the valve opening 511 and the vent opening 515. The coupling structure 520, including the sealing region(s) 524 can have configurations and alternate configurations that have been described above.

The valve mounting surface 512 is generally configured to sealably receive the valve 530 around the valve opening 511. The valve 530 selectively obstructs a valve airflow pathway 506. In the current example, the valve mounting surface 512 includes a sealing component 514 that is configured to form a seal with the valve 530. In some other embodiments, the valve 530 itself can include the sealing component that is configured to form a seal with the valve mounting surface 512.

In the current example, the pressure relief assembly 500 has a sealing ring 590 that is coupled to the frame 510. It is noted that the term "ring" does not necessarily mean a component having a circular shape, although the sealing ring certainly could have a circular shape. Rather, the term "ring" is used herein to refer to structures having a central opening and material completely surrounding the central opening. The sealing ring 590 has a first axial end that is the sealing loop 526 and a second axial end that forms a perimetric sealing surface around the valve opening 511 and the valve opening. A portion of the perimetric sealing surface defines a portion of the sealing component 514 between the valve 530 and the frame 110. In some embodiments, the frame 510 can be overmolded to the sealing ring 590. In some embodiments, the sealing ring 590 can have a series of discrete axial extension portions 592 connecting the first axial end 502 and the second axial end 504. The discrete axial extension portions 592 can be radially spaced around a central axis. More particularly, the discrete axial extension portions 592 can be radially spaced around the valve opening 511 and the vent opening 515.

In the current example, a barrier seal 518 extends along the barrier wall 517 between the vent opening 515 and the valve opening 511 to form another portion of the sealing component 514 between the valve 530 and the frame 110. In some other embodiments, multiple discrete components can define the various sealing regions between the pressure relief assembly 500 and the enclosure and between the frame 110 and the valve 530 around the valve opening 511.

The valve 530 is generally configured to accommodate pressure release from an enclosure. The valve 530 is generally configured to accommodate pressure release from the first axial end 502 to the second axial end 504 through the frame 510. The valve 530 has a valve body 532 sealably disposed on the valve mounting surface 512 across the valve opening 511 such that the valve airflow pathway 506 is obstructed by the valve body 532. The valve body 532 can be consistent with valve bodies described in detail above. It is noted that in the current example, however, the valve body 532 has a different profile shape in the lateral direction than in the example of FIGS. 1-4. In the current example the valve body 532 and the vent cover 552 are formed by a single, unitary component that is referred to as a "cap" 580 herein. The cap 580 is both the valve body 532 and the vent cover 552. In the current example, the cap 580 forms a seal with the frame around the valve opening 511. In particular, the cap 580 and the frame 110 form a seal via the sealing component 514 around the valve opening 511.

In the present example, the valve 530 has a first detent 540 that releasably secures the valve body 532 to the frame 510. The first detent 540 is configured to release the valve body 532 from the frame 510 upon a minimum pressure differential across the valve opening 511. In the current example, the valve 530 has a single detent 540. The detent 540 is fixed to the cap 580, which is also the valve body 532. An engagement surface on the detent 540 frictionally engages a mating surface 545 of the frame 510, although the reverse configuration is possible where the detent 540 is fixed to the frame and frictionally engages the cap 580 and/or the valve body 532. Furthermore, a detent can employ additional or different forces to engage the frame 510 and the valve body 532, such as magnetic forces. In the current example the detent 540 is a spring-loaded detent, but the detent 540 can have alternate configurations described above. Furthermore, in some embodiments the pressure relief assembly can include additional detents 540 that releasably couple the valve body 532 to the frame.

In the current example, the pressure relief assembly has a hinge 570a, 570b that pivotably couples the valve body 532 to the frame 510. The hinge 570a, 570b generally defines the translation path of the valve body 532. The hinge 570a, 570b is generally configured to accommodate pivoting of the cap 580, and in particular the valve body 532 upon the application of pressure on the surface of the valve body 532 in communication with the enclosure, such as the force resulting from a minimum pressure differential across the valve body 532, which results in deployment of the detent(s) 540. The cap 580 is generally pivotable outward relative to the enclosure.

In the current example, the hinge 570a, 570b is positioned oppositely of the first detent 540 relative to the valve body 532 in the lateral direction. The hinge 570a, 570b is positioned on a second lateral end 584 of the cap 580, and therefore the valve body 532, that is opposite a first lateral end 582 of the cap 580. In the current example, the hinge 570a, 570b is mutually defined by reciprocal structures of the frame 510 and the cap 580. In some embodiments the hinge 570a, 570b can be a separate component that pivotably couples the cap 580 and the frame 510.

When pressure inside the enclosure (to which the pressure relief assembly 500 is coupled) spikes above a minimum pressure differential between inside the enclosure and the outside environment, the pressure inside the enclosure pushes against the enclosure side of the cap 580/valve body 532, which deploys the detent 540 (similar to the discussion above) to decouple the first lateral end 582 of the valve body 532 and the frame 510. The valve body 532 then pivots in response to the pressure in a direction away from the enclosure to clear the valve airflow pathway 506 and allow pressure equalization between inside the enclosure and the outside environment.

In some embodiments, the valve body 532 is generally configured to be clear of the valve airflow pathway 506 upon the minimum pressure differential across the valve opening 511. Such a configuration may advantageously maximize pressure release from the enclosure to the outside environment. In the current example, however, the valve body 532 is configured to remain coupled to the frame 510 via the hinge 570a, 570b upon the minimum pressure differential across the valve opening 511.

Figure 11:
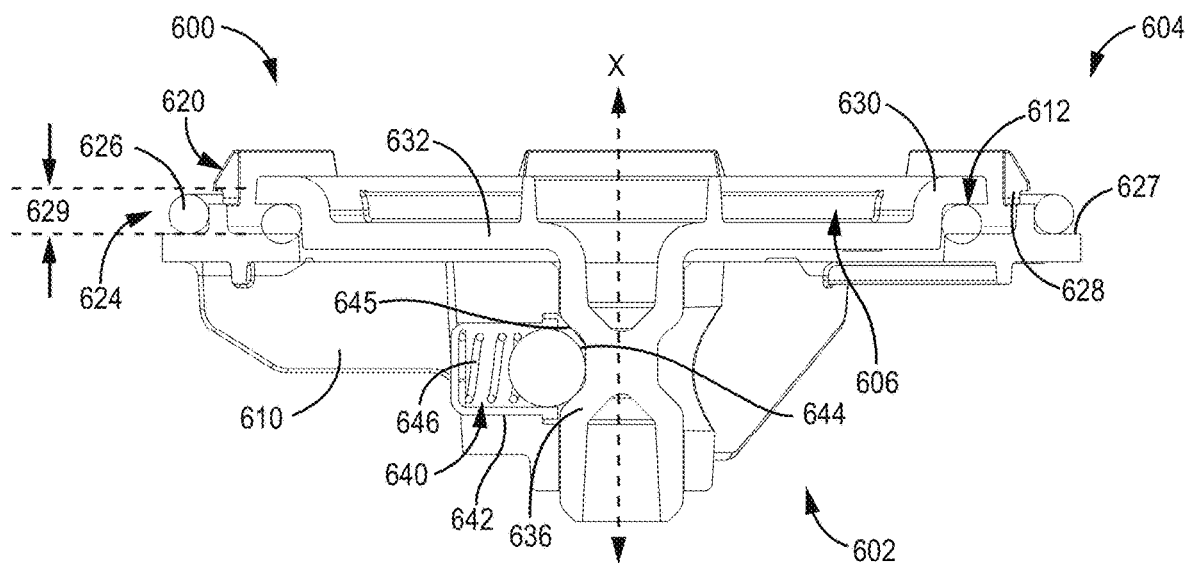
FIG. 11 is a cross-sectional view of another pressure relief assembly consistent with the technology disclosed herein.
Figure 12:
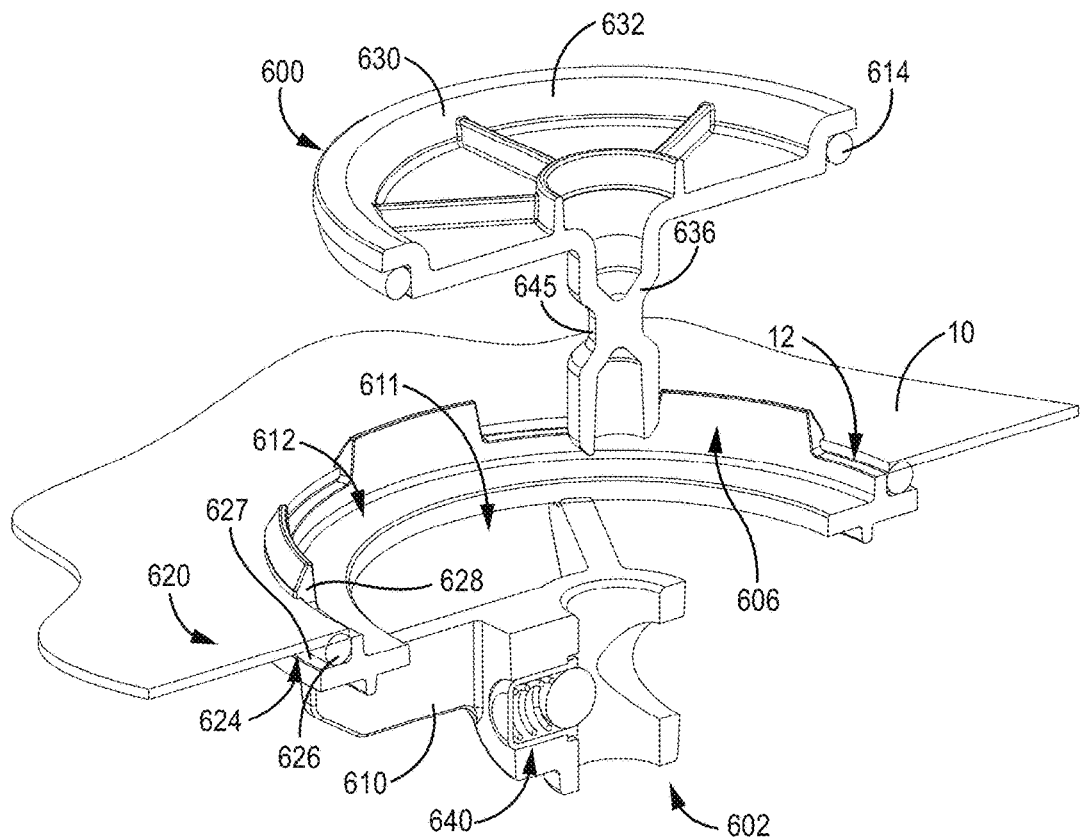
FIG. 12 is a cross-sectional exploded perspective view of the pressure relief assembly of FIG. 11.

FIGS. 11 and 12 depict another example of a pressure relief assembly 600 consistent with the technology disclosed herein. FIG. 11 is a cross-sectional view of the pressure relief assembly 600 and FIG. 12 is an exploded perspective cross-sectional view of the pressure relief assembly 600. The present figures also depict an example enclosure 10, which the pressure relief assembly 600 is configured to be coupled to. As with the examples discussed above, the pressure relief assembly 600 is generally configured to be coupled to the enclosure 10 about an enclosure opening 12. The pressure relief assembly 600 generally has a first axial end 602, a second axial end 604, and a valve airflow pathway 606 extending from the first axial end 602 through the second axial end 604. The valve airflow pathway 606 is selectively obstructed by a valve 630, where the valve 630 is configured to relieve pressure when the pressure within the enclosure relative to the outside environment exceeds a minimum pressure differential.

The pressure relief assembly 600 has a frame 610 and the valve 630 is coupled to the frame 610. The frame 610 is generally configured to support one or more components of the pressure relief assembly 600. The frame 610 has a coupling structure 620, a valve mounting surface 612, and a valve opening 611 (FIG. 12) within the valve mounting surface 612. The valve airflow pathway 606 selectively extends through the valve opening 611. Unlike some embodiments discussed above, here the frame 610 does not particularly define a vent mounting surface and a vent opening within the vent mounting surface. In some other embodiments, however, the frame can define a vent mounting surface and a vent opening within the vent mounting surface.

The coupling structure 620 is generally configured to sealably couple to the enclosure 10 about an enclosure opening 12. The coupling structure 620 is generally configured to engage the enclosure 10. The coupling structure 620 is defined towards the second axial end 604 of the pressure relief assembly 600. In the current example, the coupling structure 620 is configured to form a compression fit with the enclosure 10 around the enclosure opening 12. The coupling structure 620 can include a sealing region 624 configured to accommodate a seal, such as a sealing loop 626, between the pressure relief assembly 600 and the enclosure 10 when the pressure relief assembly 600 is coupled to the enclosure 10. The sealing region 624 can surround the valve opening 611. The sealing region 624 surrounds the valve airflow pathway 606. In the current example, the sealing region 624 surrounds the valve opening 611.

In the current example, the coupling structure 620 includes an inner retaining rim 627 and an outer retaining rim 628 that each extend radially outward from the frame 610. The inner retaining rim 627 is configured to be positioned within the enclosure 10. The outer retaining rim 628 is configured to be positioned outside of the enclosure 10. The inner retaining rim 627 and the outer retaining rim 628 form a perimetric gap 629 extending in the axial direction that is configured to receive the wall of the enclosure 10 around the enclosure opening 12. The perimetric gap 629 is configured to compressibly receive the wall of the enclosure 10 and the sealing loop 626. In the current example, the outer retaining rim 628 is a plurality of discrete sections spaced perimetrically around the frame 610, but in other examples, the outer retaining rim 628 can be a single cohesive component extending perimetrically around the frame 610.

The coupling structure 620, including the sealing region(s) 624 can have configurations and alternate configurations that have been described above. For example, in some other embodiments, similar to examples described above, the coupling structure 620 can have a plurality of fastener receptacles that are each configured to receive a fastener that fastens the pressure relief assembly 600 to the enclosure.

The valve mounting surface 612 is generally configured to sealably receive the valve 630 around the valve opening 611. The valve 630 selectively obstructs a valve airflow pathway 606. In the current example, the valve 630 itself can include the sealing component 614 that is configured to form a seal with the valve mounting surface 612. In some other embodiments, the valve mounting surface 612 includes the sealing component 614 that is configured to form a seal with the valve 630.

The valve 630 is generally configured to accommodate pressure release from the enclosure 10. The valve 630 is generally configured to accommodate pressure release from the first axial end 602 to the second axial end 604 through the frame 610. The valve 630 has a valve body 632 sealably disposed on the valve mounting surface 612 across the valve opening 611 such that the valve airflow pathway 606 is obstructed by the valve body 632. The valve body 632 can be consistent with valve bodies described in detail above. In the current example the has a circular profile shape in the lateral direction, but the valve body 632 has an alternate profile shape such as polygonal.

In the present example, the pressure relief assembly 600, and in particular the frame 610, has a first detent 640 that releasably secures the valve body 632 to the frame 610. The first detent 640 is configured to release the valve body 632 from the frame 610 upon a minimum pressure differential across the valve opening 611. In the current example, the assembly 600 has a single detent 640. The detent 640 is fixed to the frame 610. An engagement surface 644 on the detent 640 frictionally engages the valve 630, although the reverse configuration is possible where the detent 640 is fixed to the valve 630 and frictionally engages the frame 610. Furthermore, different or additional forces can engage the frame 610 and the valve 630, such as magnetic forces. In the current example the detent 640 is a spring-loaded detent and has a similar configuration to that described above with reference to FIGS. 1-4, but the detent 640 can have alternate configurations that are also described above. Furthermore, in some embodiments the pressure relief assembly can include additional detents 640 that releasably couple the valve body 632 to the frame 610.

In the current example, the valve 630 has the valve body 632 and a valve stem 636. The valve stem 636 extends outward axially from the valve body 632 towards the first end 602 of the assembly 600. The valve stem 636 defines a mating surface 645 that is frictionally engaged by the engagement surface 644 of the detent 640. When the pressure in the enclosure 10 increases to attain a minimum pressure differential between the enclosure 10 and the outside environment, the force between the valve 630 and the detent engagement surface 644 increases until the biasing force of the compression spring 646 is overcome, causing lateral translation of the detent engagement surface 644 against a compression spring 646, towards a first end of the detent housing 642. The pressure differential between the enclosure 10 and the outside environment results in a force that pushes the valve body 632 out from the valve opening 611, which is unopposed by the detent 640. The valve body 632 is ejected from the frame 610 in response to the pressure differential, in a direction away from the enclosure 10 to clear the valve airflow pathway 606 and allow pressure equalization between inside the enclosure 10 and the outside environment. In some embodiments, the valve body 632 is configured to be clear of the valve airflow pathway 606 upon the minimum pressure differential across the valve opening 611.

Figure 13:
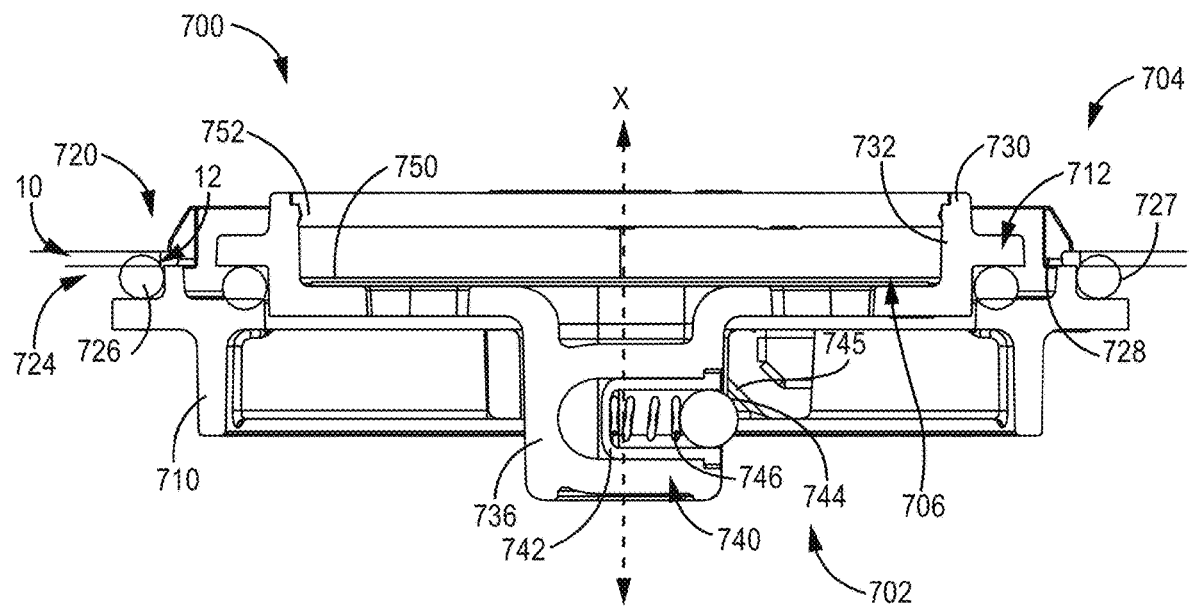
FIG. 13 is a cross-sectional view of another pressure relief assembly consistent with the technology disclosed herein.
Figure 14:
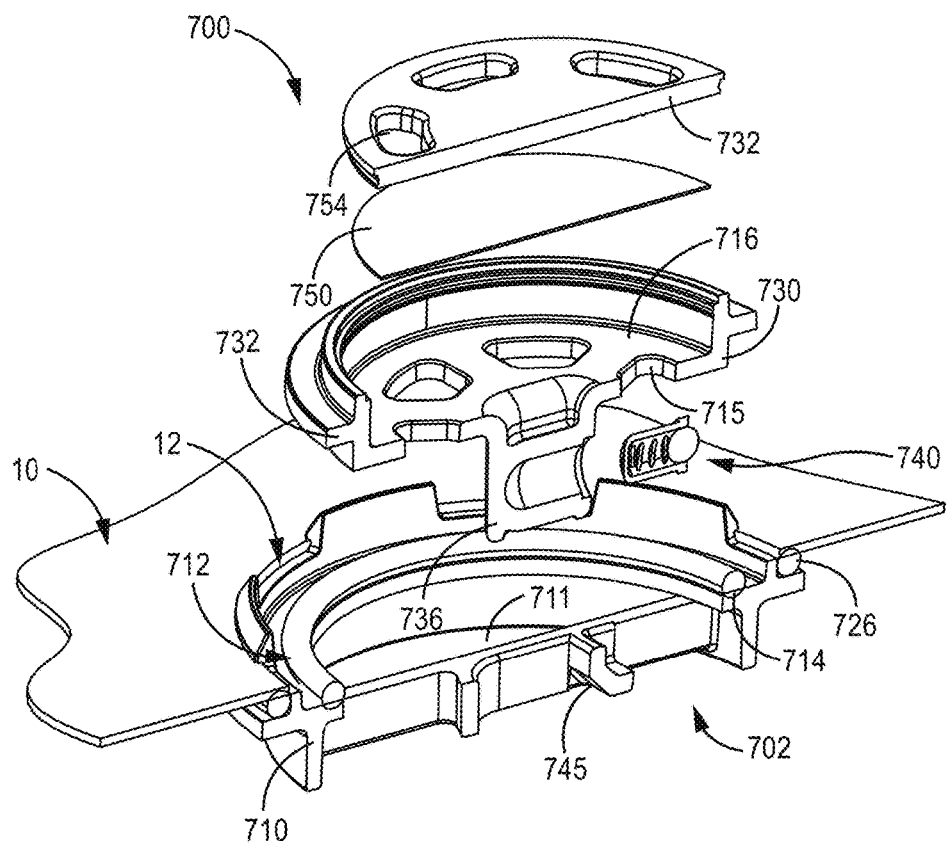
FIG. 14 is a cross-sectional exploded perspective view of the pressure relief assembly of FIG. 13.

FIGS. 13 and 14 depict yet another example of a pressure relief assembly 700 consistent with the technology disclosed herein. FIG. 13 is a cross-sectional view of the pressure relief assembly 700 and FIG. 14 is an exploded perspective cross-sectional view of the pressure relief assembly 700. The present figures also depict an example enclosure 10, which the pressure relief assembly 700 is configured to be coupled to. As with the examples discussed above, the pressure relief assembly 700 is generally configured to be coupled to the enclosure 10 about an enclosure opening 12. The pressure relief assembly 700 generally has a first axial end 702, a second axial end 704, and a valve airflow pathway 706 extending from the first axial end 702 through the second axial end 704. The valve airflow pathway 706 is selectively obstructed by a valve 730, where the valve 730 is configured to relieve pressure when the pressure within the enclosure relative to the outside environment exceeds a minimum pressure differential.

The pressure relief assembly 700 has a frame 710 and the valve 730 is coupled to the frame 710. The frame 710 is generally configured to support one or more components of the pressure relief assembly 700. The frame 710 has a coupling structure 720, a valve mounting surface 712, and a valve opening 711 (FIG. 12) within the valve mounting surface 712. The valve airflow pathway 706 selectively extends through the valve opening 711.

In the current example, the pressure relief assembly 700 incorporates a vent 750. Unlike some embodiments described elsewhere herein, in the current example, the frame 710 does not define a vent opening that is separate from the valve opening 711. Rather, the valve opening 711 overlaps with a vent opening 715. In the current example, the valve body 732 defines the vent opening 715 and a vent mounting surface 716 around the vent openings 715. The vent 750 is coupled to the vent mounting surface 716 across the vent opening 715. The vent 750 is functionally parallel to the valve 730 relative to airflow through the pressure relief assembly 700. In some embodiments, the pressure relief assembly 700, such as in the example described above with reference to FIGS. 11-12. lacks a vent, however. In some embodiments, the vent 750 is arranged in series with an inlet relief valve with respect to airflow through the pressure relief assembly 700, which has been discussed above with reference to FIG. 5.

The vent 750 is positioned in fluid communication with the inside of the enclosure 10. The vent 750 is configured to allow gases to pass between inside the enclosure 10 and the environment outside of the enclosure 10 by flowing through vent 750. The vent 750 can be consistent with discussions of vents earlier herein. The pressure relief assembly 700 has a vent cover 752 extending laterally across the vent 750 such that the vent 750 is positioned in the axial direction between the frame 710 and the vent cover 752. The vent cover 752 is generally spaced in the axial direction from the vent 750. The vent cover 752 can be consistent with vent covers discussed above. In the current example, an environmental opening 754 is defined by the vent cover 752 that defines a vent airflow pathway between the vent 750 and the external environment. The environmental opening 754 can be perpendicular to the vent 750 in some embodiments, but in the current example the environmental opening 754 is geometrically parallel to the vent 750.

The coupling structure 720 is generally configured to sealably couple to the enclosure 10 about an enclosure opening 12. The coupling structure 720 is generally configured to engage the enclosure 10 and can be consistent with other coupling structures, and modifications thereof, described elsewhere herein. Similar to the description of FIGS. 11-12, the coupling structure 720 is configured to form a compression fit with the enclosure 10 around the enclosure opening 12. The coupling structure 720 can include a sealing region 724 configured to accommodate a seal, such as a sealing loop 726, between the pressure relief assembly 700 and the enclosure 10 when the pressure relief assembly 700 is coupled to the enclosure 10. The coupling structure 720 has an inner retaining rim 727 and an outer retaining rim 728 that each extend radially outward from the frame 710 and form a perimetric gap 729 extending in the axial direction that is configured to receive the wall of the enclosure 10 around the enclosure opening 12. The perimetric gap 729 is configured to compressibly receive the wall of the enclosure 10 and the sealing loop 726.

The valve mounting surface 712 is configured to sealably receive the valve 730 around the valve opening 711. The valve 730 and the vent 750 selectively obstruct the valve airflow pathway 706. In the current example, the valve mounting surface 712 includes a sealing component 714 that is configured to form a seal with the valve 730. In some other embodiments, the valve 730 itself can include the sealing component 714 that is configured to form a seal with the valve mounting surface 712.

The valve 730 is generally configured to accommodate pressure release from the enclosure 10. The valve 730 is generally configured to accommodate pressure release from the first axial end 702 to the second axial end 704 through the frame 710. The valve 730 has a valve body 732 disposed on the valve mounting surface 712 across the valve opening 711 such that the valve airflow pathway 706 is obstructed by the valve body 732 and the vent 750. The valve body 732 can be consistent with valve bodies described in detail above. In the current example the has a circular profile shape in the lateral direction, but the valve body 732 has an alternate profile shape such as a polygonal profile shape.

In the current example, the pressure relief assembly 700, and in particular the valve 730, has a first detent 740 that releasably secures the valve body 732 to the frame 710. The first detent 740 is configured to release the valve 730 upon a minimum pressure differential across the valve opening 711. In the current example, the assembly 700 has a single detent 740. The detent 740 is fixed to the valve 730. An engagement surface 744 on the detent 740 frictionally engages the frame 710, although the reverse configuration is possible where the detent 740 is fixed to the frame 710 and frictionally engages the valve 730, an example of which is described above. Furthermore, different or additional forces can engage the frame 710 and the valve 730, such as magnetic forces. In the current example the detent 740 is a spring-loaded detent and has a similar configuration to that described above with reference to FIGS. 1-4, but the detent 740 can have alternate configurations that are also described above. Furthermore, in some embodiments the pressure relief assembly can include additional detents 740 that releasably couple the valve body 732 to the frame 710.

In the current example, the valve 730 has the valve body 732 and a valve stem 736. The valve stem 736 extends outward in the axial direction from the valve body 732 towards the first end 702 of the assembly 700. The valve stem 736 defines a detent receptacle that the detent 740 is fixed to. The frame 710 has a mating surface 745 that is frictionally engaged by the engagement surface 744 of the detent 740. When the pressure in the enclosure 10 increases to attain a minimum pressure differential between the enclosure 10 and the outside environment, the force between the frame 710 and the detent engagement surface 744 increases until the biasing force of the compression spring 746 is overcome, causing lateral translation of the detent engagement surface 744 against a compression spring 746, towards a first end of the detent housing 742. The pressure differential between the enclosure 10 and the outside environment results in a force that pushes the valve body 732 out from the valve opening 711, which overcomes the force exerted by the detent 740 to maintain engagement between the valve 730 and the frame 710. The valve body 732 is ejected from the frame 710 in response to the pressure differential, in a direction away from the enclosure 10 to clear the valve airflow pathway 706 and allow pressure equalization between inside the enclosure 10 and the outside environment. In some embodiments, the valve body 732 is configured to be clear of the valve airflow pathway 706 upon the minimum pressure differential across the valve opening 711.

Figure 15:
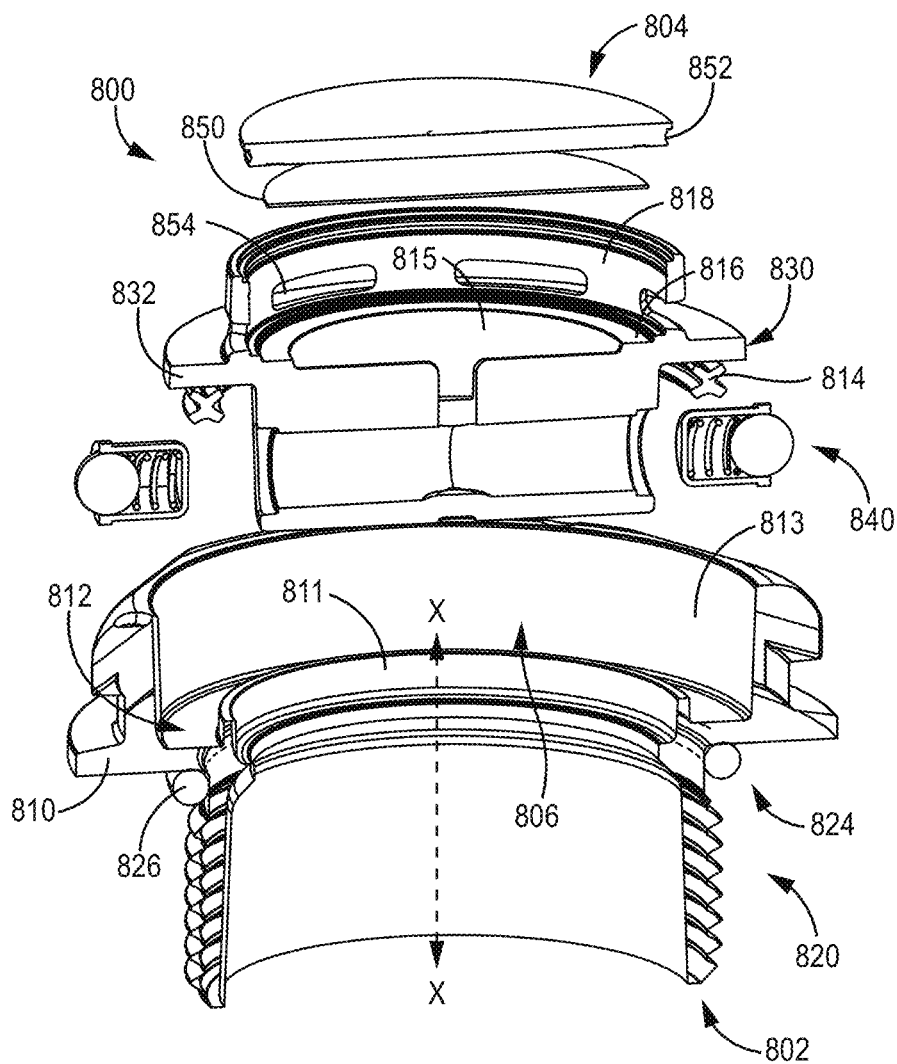
FIG. 15 is an exploded perspective cross-sectional view of another example pressure relief assembly.

FIG. 15 depicts yet another example of a pressure relief assembly 800 consistent with the technology disclosed herein. FIG. 15 is an exploded perspective cross-sectional view of the pressure relief assembly 800. As with the examples discussed above, the pressure relief assembly 800 is generally configured to be coupled to the enclosure about an opening in the enclosure. The pressure relief assembly 800 generally has a first axial end 802, a second axial end 804, and a valve airflow pathway 806 extending from the first axial end 802 through the second axial end 804. The valve airflow pathway 806 is selectively obstructed by a valve 830, where the valve 830 is configured to relieve pressure when the pressure differential between the inside of the enclosure and the outside environment exceeds a minimum pressure differential.

The pressure relief assembly 800 has a frame 810 and the valve 830 is coupled to the frame 810. The frame 810 is generally configured to support one or more components of the pressure relief assembly 800. The frame 810 has a coupling structure 820.

In the current example, the frame 810 defines a valve opening 811. The valve airflow pathway 806 selectively extends through the valve opening 811. In the current example, the pressure relief assembly 800 incorporates a vent 850. Unlike some embodiments described elsewhere herein, in the current example, the valve 830 has a valve sidewall 818 that extends in the axial direction between the first axial end 802 and the second axial end 804. The valve sidewall 818 extends from the vent cover 852 to a vent mounting surface 816. The valve sidewall 818 surrounds the vent mounting surface 816. While the valve sidewall 818 is perpendicular to the valve opening 811, in some embodiments the valve sidewall 818 can form a different angle with the valve opening 811. The valve sidewall 818 defines one or more environmental openings 854. The environmental opening 854 can be defined between the vent 850 and the vent mounting surface 816 that is configured to define a vent airflow pathway between the vent 850 and the external environment. The environmental opening 854 can be perpendicular to the vent 850. The environmental opening 854 can be positioned axially between the vent 850 and the vent mounting surface 816. In the current example, the valve sidewall 818 defines a plurality of environmental openings 854, but in some embodiments the valve sidewall 818 defines a single environmental opening 854. In some embodiments the environmental openings 854 are spaced around an axis x extending in the axial direction. The axis x can be a central axis of the frame 810 in some embodiments.

In the current example, the pressure relief assembly 800 incorporates a vent 850. Unlike some embodiments described elsewhere herein, in the current example, the frame 810 does not define a vent opening 815 that is separate from the valve opening 811. Rather, the valve opening 811 overlaps with a vent opening 815. In the current example, the valve body 832 defines the vent opening 815 and a vent mounting surface 816 around the vent openings 815. The vent 850 is coupled to the vent mounting surface 816 across the vent opening 815. The vent 850 is functionally parallel to the valve 830 relative to airflow through the pressure relief assembly 800. In some embodiments, the pressure relief assembly 800 lacks a vent, however. In some embodiments, the vent 850 is arranged in series with an inlet relief valve with respect to airflow through the pressure relief assembly 800, which has been discussed above with reference to FIG. 5.

The vent 850 is configured to be positioned in fluid communication with the inside of the enclosure (not currently depicted, but examples of which are described and shown elsewhere herein). The vent 850 is configured to allow gases to pass between inside the enclosure and the environment outside of the enclosure by flowing through vent 850. The vent 850 can be consistent with discussions of vents earlier herein. The pressure relief assembly 800 has a vent cover 852 extending laterally across the vent 850 such that the vent 850 is positioned in the axial direction between the frame 810 and the vent cover 852. The vent cover 852 is generally spaced in the axial direction from the vent 850. The vent cover 852 can be consistent with vent covers discussed above. In the current example, the vent cover 852 does not define an environmental opening between the vent 850 and the external environment.

The coupling structure 820 is generally configured to sealably couple to the enclosure about an enclosure opening, and can be consistent with other coupling structures, and modifications thereof, described elsewhere herein. Similar to the description of FIG. 8, the coupling structure 820 is generally configured to engage the enclosure. The coupling structure 820 includes a sealing region 824 configured to accommodate a sealing loop 826 between the pressure relief assembly 800 and the enclosure when the pressure relief assembly 800 is coupled to the enclosure. In the current example, the coupling structure 820 includes a threaded portion extending axially from the sealing region 824. The threaded portion is configured to rotatably engage a mating inner circumferential surface of an enclosure about an enclosure opening. In this example, the coupling structure 820 is defined towards the first axial end 802 of the pressure relief assembly 800. The sealing region 824 generally surrounds the valve airflow pathway 806. In the current example, the sealing region 824 surrounds the threaded extension. The coupling structure 820, including the sealing region(s) 824 can have alternative configurations that have been described above.

In the current example, the frame 810 also defines a valve mounting surface 812. The valve mounting surface 812 is configured to sealably receive the valve 830 around the valve opening 811. In the current example the valve mounting surface 812 can be consistent with valve mounting surfaces described in detail above. The valve 830 and the vent 850 selectively obstruct the valve airflow pathway 806. In the current example, the valve 830 includes a sealing component 814 that is configured to form a seal with the valve mounting surface 812. In some other embodiments, the valve mounting surface 812 includes the sealing component 814 that is configured to form a seal with the valve 830.

The valve 830 is generally configured to accommodate pressure release from the enclosure. The valve 830 is generally configured to accommodate pressure release from the first axial end 802 to the second axial end 804 through the frame 810. The valve body 832 is sealably disposed on the valve mounting surface 812 across the valve opening 811 such that the valve airflow pathway 806 is obstructed by the valve body 832. The valve body 832 can be consistent with valve bodies described in detail above.

In the present example, the valve 830 has a plurality of detents 840 that releasably secure the valve body 832 to the frame 810. The detents are configured to release the valve body 832 from the frame 810 upon a minimum pressure differential across the valve opening 811. The detents 840 are disposed around an outer perimetric surface, such as an outer circumferential surface, of the valve body 832. The detent(s) 840 can have a variety of configurations. In the current example, each of the detents 840 is a spring-loaded detent. A spring-loaded detent is a detent that employs a compression spring to secure the valve 830 to the frame 810 and the spring force is overcome by the release force to release the valve 830 from the frame 810. Each detent 840 extends laterally from the frame 810 to the valve body 832. In the current example, each detent 840 is fixed to the valve body 832 and each detent 840 frictionally engages the frame 810, although the reverse configuration is also possible where each detent 840 is fixed to the frame 810 and frictionally engages the valve body 832. Furthermore, other types of engagement are possible such as magnetic engagement. Each detent 840 can have alternative configurations that have been described above.

In the current example, the detents 840 releasably secure the valve body 832 to the frame 810. In some examples, although not currently visible, a hinge can pivotably couple the valve body 832 to the frame 810. The hinge can be consistent with hinges described in detail above.

When pressure inside the enclosure spikes above a minimum pressure differential between inside the enclosure and the outside environment, the pressure inside the enclosure pushes against the enclosure side of the valve body 832, which deploys the detent 840 (similar to the discussion above) to decouple the valve body 832 from the valve mounting surface 812. The valve body 832 can either be released from the frame 810 or, in embodiments incorporating a hinge, can pivot in response to the pressure in a direction away from the enclosure to clear the valve airflow pathway 806 and allow pressure equalization between inside the enclosure and the outside environment.

In the present example, the frame 810 has a frame sidewall 813. The frame sidewall 813 is positioned radially outward from the valve sidewall 818. The frame sidewall 813 surrounds the valve sidewall 818. In the current example, the valve sidewall 818 and the frame sidewall 813 share a central axis. In the current example, the valve sidewall 818 and the frame sidewall 813 are spaced via a radial gap between them. In some embodiments, the frame sidewall 813 and the valve sidewall 818 define a tortuous flow path from the outside environment to the vent 850 through the environmental openings 854. As used herein, a "tortuous flow path" refers to a flow path in which there is no direct line of sight to the vent 850 from the second axial end 804. Such configuration may advantageously prevent liquids or debris from directly impacting the vent. In some other embodiments, such as in some other embodiments described elsewhere herein, there is not a tortuous flow path from the outside environment to the vent 850 through the environmental openings 854. In some embodiments the frame sidewall defines one or more openings 813.

In some embodiments, the valve body 832 is generally configured to be clear of the valve airflow pathway 806 upon the minimum pressure differential across the valve opening 811. Such a configuration can be consistent with valve bodies described in detail above.

Figure 16:
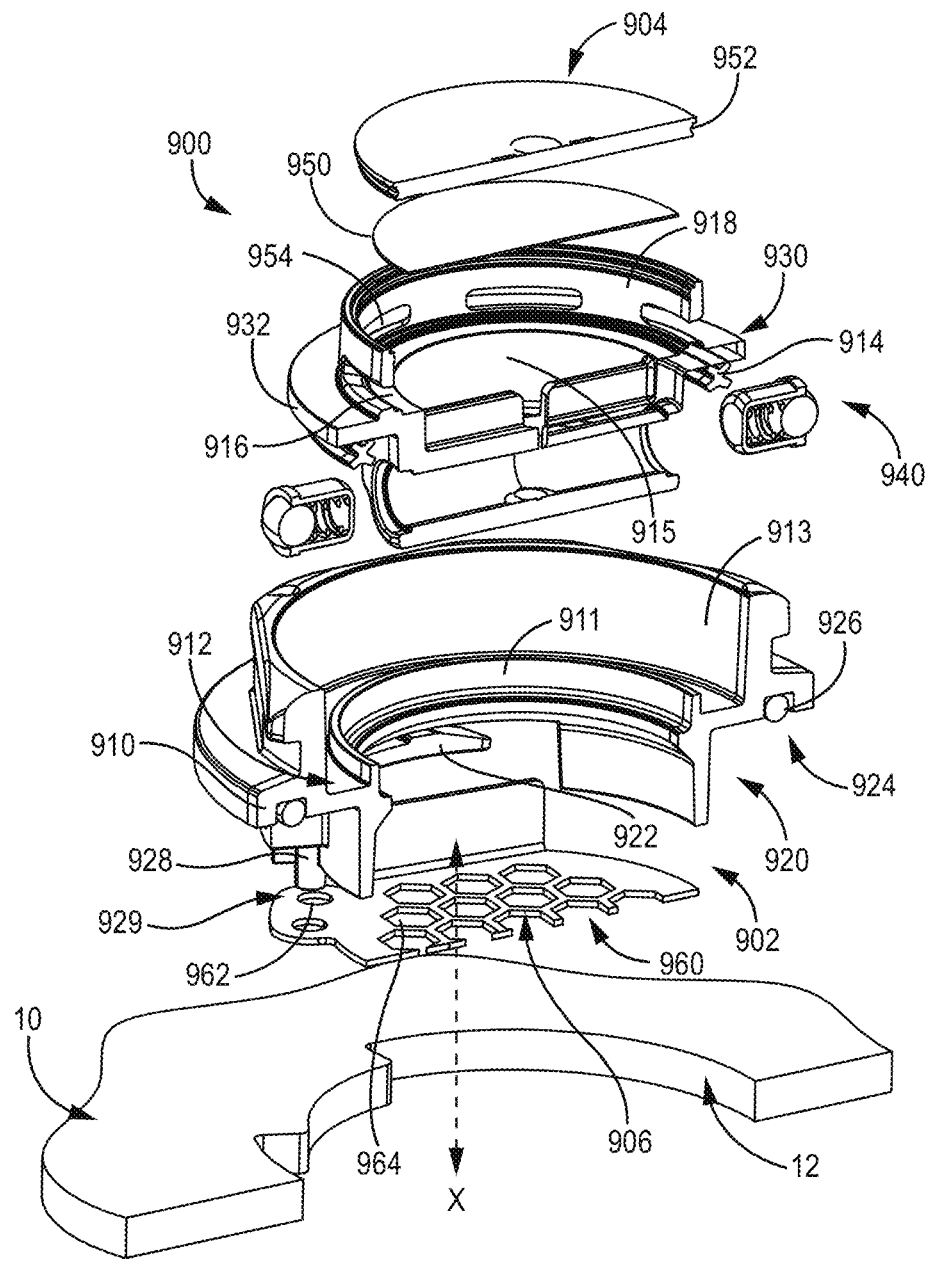
FIG. 16 is an exploded perspective cross-sectional view of yet another example pressure relief assembly.
Figure 17:
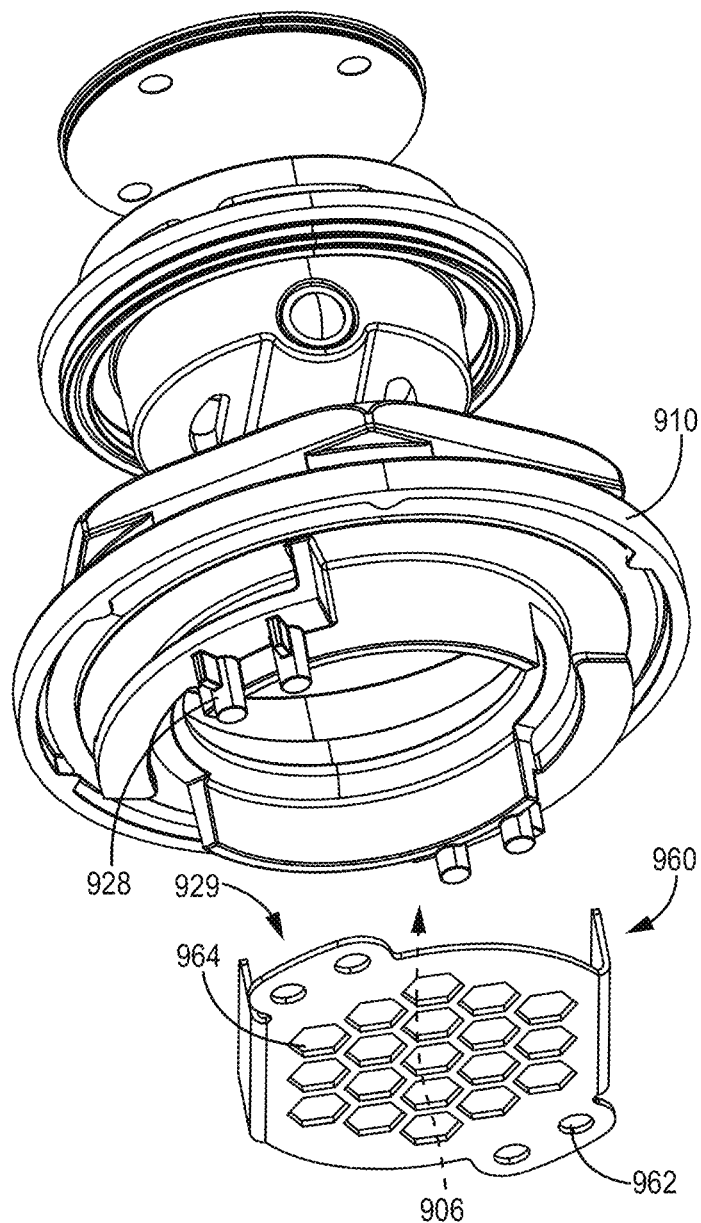
FIG. 17 is an exploded view from a second perspective of the example pressure relief assembly of FIG. 16.
Figure 18:
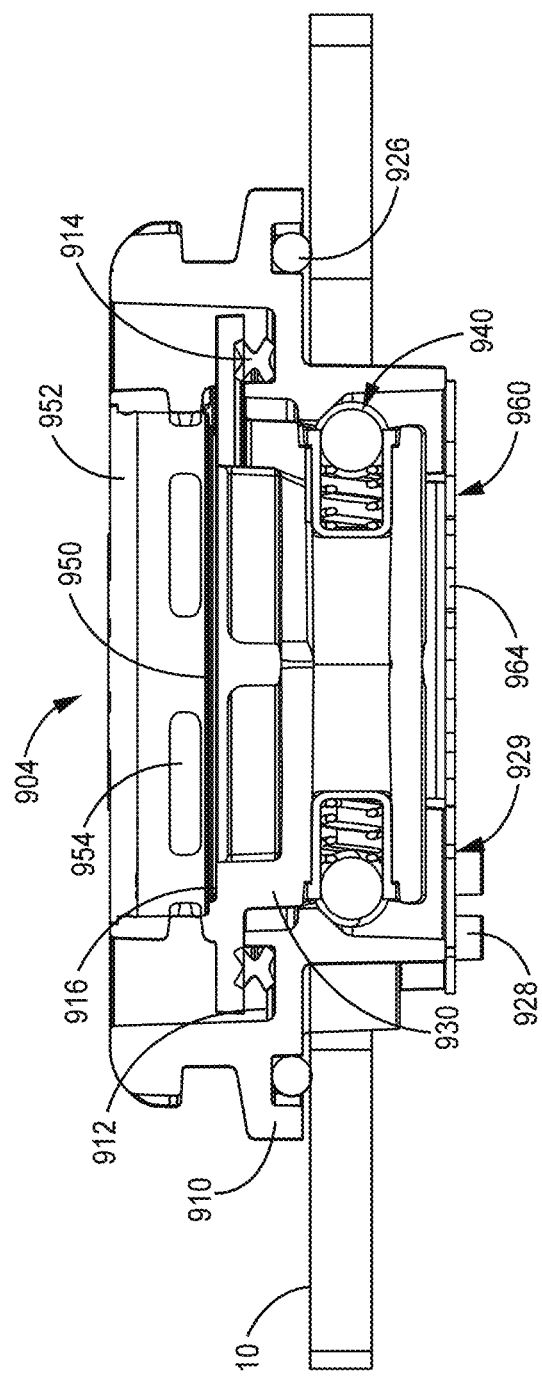
FIG. 18 is a cross-sectional view of the example pressure relief assembly of FIG. 16.

FIG. 16 depicts yet another example of a pressure relief assembly 900 consistent with the technology disclosed herein. FIG. 16 is an exploded perspective cross-sectional view of the pressure relief assembly 900. FIG. 17 is an exploded view from a second perspective of the example pressure relief assembly 900, and FIG. 18 is a cross-sectional view of the example pressure relief assembly 900 of FIG. 16. As with the examples discussed above, the pressure relief assembly 900 is generally configured to be coupled to an enclosure 10 about an opening 12 in the enclosure 10. The pressure relief assembly 900 generally has a first axial end 902, a second axial end 904, and a valve airflow pathway 906 extending from the first axial end 902 through the second axial end 904. The valve airflow pathway 906 is selectively obstructed by a valve 930, where the valve 930 is configured to relieve pressure when the pressure differential between the inside of the enclosure and the outside environment exceeds a minimum pressure differential.

The pressure relief assembly 900 has a frame 910 and the valve 930 is coupled to the frame 910. The frame 910 is generally configured to support one or more components of the pressure relief assembly 900. The frame 910 has a coupling structure 920. The coupling structure 920 can be consistent with coupling structures described in detail above.

In the current example, the frame 910 defines a valve opening 911. The valve airflow pathway 906 selectively extends through the valve opening 911. In the current example, the pressure relief assembly 900 incorporates a vent 950. As described above with reference to FIG. 15, in the current example, the valve 930 has an axial sidewall 918 that extends in the axial direction from the vent cover 952 to a vent mounting surface 916. The axial sidewall 918 surrounds the vent mounting surface 916. The axial sidewall 918 defines one or more environmental openings 954. The environmental opening 954 can be defined between the vent 950 and the vent mounting surface 916. The environmental opening 954 defines a portion of the vent airflow pathway between the vent 950 and the external environment. The environmental opening 954 can be perpendicular to the vent 950. The environmental opening 954 can be positioned axially between the vent 950 and the vent mounting surface 916. In the current example, the axial sidewall 918 defines a plurality of environmental openings 954, but in some embodiments the axial sidewall 918 defines a single environmental opening 954. In some embodiments the environmental openings 954 are spaced around an axis x extending in the axial direction. The axis x can be a central axis of the frame 910. The valve 930 and the environmental openings 954 can be consistent with descriptions above.

The vent 950 is configured to be positioned in fluid communication with the inside of the enclosure 10 (FIGS. 16 and 18). The vent 950 is configured to allow gases to pass between inside the enclosure 10 and the environment outside of the enclosure 10 by flowing through vent 950. The vent 950 can be consistent with discussions of vents earlier herein. The pressure relief assembly 900 has a vent cover 952 extending laterally across the vent 950 such that the vent 950 is positioned in the axial direction between the frame 910 and the vent cover 952. The vent cover 952 is generally spaced in the axial direction from the vent 950. The vent cover 952 can be consistent with vent covers discussed above. In the current example, the vent cover 952 does not define an environmental opening between the vent 950 and the external environment. The coupling structure 920 is generally configured to sealably couple to the enclosure 10 about an enclosure opening 12, and can be consistent with other coupling structures, and modifications thereof, described elsewhere herein. The coupling structure 920 is generally configured to engage the enclosure 10. In the current example, similar to the description of FIG. 9, the coupling structure 920 has a bayonet connector 922 that is configured to be received by a mating bayonet connector defined by the enclosure 10. In this example, the coupling structure 920 is defined towards the first axial end 902 of the pressure relief assembly 900. The coupling structure 920 can include a sealing region 924 configured to accommodate a seal, such as a sealing loop 926, between the pressure relief assembly 900 and the enclosure 10 when the pressure relief assembly 900 is coupled to the enclosure 10. The sealing region 924 can surround the valve opening 911, such as in the example currently depicted. The sealing region 924 surrounds the valve airflow pathway 906. The coupling structure 920, including the sealing region(s) 924 can have configurations and alternate configurations that have been described above.

The valve 930 is generally configured to accommodate pressure release from the enclosure. The valve 930 is generally configured to accommodate pressure release from the first axial end 902 to the second axial end 904 through the frame 910. A valve body 932 is sealably disposed on a valve mounting surface 912 across the valve opening 911 such that the valve airflow pathway 906 is obstructed by the valve body 932. The valve body 932, the valve 930 and the valve mounting surface 912 can be consistent with valve bodies described in detail above.

In the present example, the valve 930 has a plurality of detents 940 that releasably secure the valve body 932 to the frame 910. The detents are configured to release the valve body 932 from the frame 910 upon a minimum pressure differential across the valve opening 911. The detents 940 are disposed around an outer perimetric surface, such as an outer circumferential surface, of the valve body 932. In the current example, the detents 940 can be consistent with valve bodies described in detail above.

When the pressure inside the enclosure spikes above a minimum pressure differential between inside the enclosure and the outside environment, the pressure inside the enclosure pushes against the enclosure side of the valve body 932, which deploys the detent 940 (similar to the discussion above) to decouple the valve body 932 from the valve mounting surface 912. The mechanism of deployment can be consistent with valve bodies described in detail above.

In some embodiments, the valve body 932 is generally configured to be clear of the valve airflow pathway 906 upon the minimum pressure differential across the valve opening 911. Such a configuration can be consistent with valve bodies described in detail above.

In the current example, the pressure relief assembly 900 incorporates a vent 950. In the current example, the valve body 932 defines the vent opening 915 and a vent mounting surface 916 around the vent openings 915. The vent 950 is coupled to the vent mounting surface 916 across the vent opening 915. The vent 950 is functionally parallel to the valve 930 relative to airflow through the pressure relief assembly 900. The vent opening 915 can be consistent with vent openings described in detail above.

In the present example, the frame 910 has a frame sidewall 913, which is consistent with the description of the frame sidewall 913 described in detail above with reference to FIG. 15. The frame sidewall 913 is configured to be positioned radially outward from the valve sidewall 818.

In the present example, the pressure relief assembly 900 has a guard 960. The guard 960 is generally configured to prevent the passages of materials from within the enclosure 10 from exiting the enclosure 10, particularly when the valve body 932 has been released from the frame 910. The guard 960 generally extends across the valve airflow pathway 906. The guard is generally configured to be fixed relative to the valve airflow pathway 906. In some embodiments, the guard 960 extends across the vent airflow pathway. In the present example, the guard 960 defines a plurality of openings 964 spaced laterally across the valve airflow pathway 906. In various embodiments, the guard 960 defines a plurality of openings 964 spaced laterally across the vent airflow pathway. The guard 960 may have any suitable number of openings 964, each of which may have any suitable opening shape. Samples of suitable axial cross-sectional shapes of the opening 964 include rectangles, circles, polygons, and irregular shapes. The openings 964 are generally sized to obstruct the passages of particles having a minimum size. In particular, each of the openings 964 has a cross-sectional area that is smaller or equal to the cross-sectional area of particles that the guard 960 is configured to obstruct.

The guard 960 is generally positioned towards the first axial end 902 of the assembly 900. In embodiments, the vent assembly may include more than one guard 960. In embodiments, the guard 960 may include multiple layers stacked in the axial direction, where each layer defines a plurality of openings. In one such example, the plurality of openings in one layer do not laterally align in the axial direction with the plurality of openings in the other layer to create a tortuous flow path through the first end 902 of the assembly 900.

The guard 960 is generally fixed relative to the valve opening 906, but the configuration of fixing the guard 960 relative to the valve opening 906 is not particularly limited. In some embodiments, the guard 960 is fastened to the enclosure 10. In the current example, the guard 960 is fastened to the frame 910. The frame 910 and the guard 960 are fastened via a coupling feature 929. In the current example, the coupling feature 929 defines an interference fit. In the current example, the coupling feature 929 includes a plurality of coupling receptacles 962 defined by the guard 960 that are each configured to frictionally engage a corresponding coupling protrusion 928 of the frame 910 to fasten the guard 960 to the frame 910. The coupling feature 929 may have any suitable number of coupling protrusion 928, each of which may have any suitable shape. Each coupling receptacle forms a mating shape that is configured to engage a corresponding structure defined by the guard 960. In some alternate embodiments, the frame 910 can define the coupling receptacles and the guard can define the coupling protrusions. In various embodiments, the coupling receptacles and coupling protrusions can be welded, such as through a heat weld, to further fix the guard 960 to the frame 910.

Other types of interference fits are also contemplated between the guard 960 and the frame 910. In some embodiments, the coupling feature 929 can form a snap-fit connection between the guard 960 and the frame 910. As another example, the coupling feature 929 can include a threaded fastener such as a screw that is configured to engage aligned fastener receptacles 962 defined by the guard 960 and the frame 910. As another example, the coupling feature 929 can define a bayonet connection between the guard 960 and the frame 910. In some embodiments, the guard 960 can be coupled to the frame 910 with an adhesive, through a weld, or through other approaches.

In some embodiments one of the guard 960 and the enclosure 10 defines a coupling protrusion and the other of the guard 960 and the enclosure 10 defines a coupling receptacle that are configured to be coupled.

It should be noted that a guard is not limited to embodiments generally consistent with FIGS. 16-18. A guard can be used with any of the pressure relief assemblies described herein.

Exemplary Aspects

Aspect 1. A pressure relief assembly comprising:
a frame comprising a coupling structure, a valve mounting surface, a valve opening within the valve mounting surface, a vent mounting surface, and a vent opening within the vent mounting surface, wherein the vent opening is functionally parallel to the valve opening;
a valve body sealably disposed on the valve mounting surface across the valve opening;
a first detent releasably securing the valve body to the frame, wherein the first detent is configured to release the valve body from the frame upon a minimum pressure differential across the valve opening; and a vent coupled to the vent mounting surface across the vent opening.

Aspect 2. The pressure relief assembly of any one of aspects 1 and 3-23, further comprising a vent cover extending laterally across the vent, wherein the vent is positioned axially between the frame and the vent cover.

Aspect 3. The pressure relief assembly of any one of aspects 1-2 and 4-23, wherein the vent cover and the valve body are a single, unitary component.

Aspect 4. The pressure relief assembly of any one of aspects 1-3 and 5-23, further defining an environmental opening perpendicular to the vent cover.

Aspect 5. The pressure relief assembly of any one of aspects 1-4 and 6-23, wherein the environmental opening is positioned axially between the vent cover and the vent.

Aspect 6. The pressure relief assembly of any one of aspects 1-5 and 7-23, wherein the environmental opening is defined by the vent cover.

Aspect 7. The pressure relief assembly of any one of aspects 1-6 and 8-23, wherein the vent is a breathable membrane.

Aspect 8. The pressure relief assembly of any one of aspects 1-7 and 9-23, further comprising a second detent releasably securing the valve body to the frame.

Aspect 9. The pressure relief assembly of any one of aspects 1-8 and 10-23, wherein the second detent extends laterally from the frame to the valve body and is configured to release the valve body from the frame upon the minimum pressure differential across the valve opening.

Aspect 10. The pressure relief assembly of any one of aspects 1-9 and 11-23, wherein the second detent is a spring-loaded detent.

Aspect 11. The pressure relief assembly of any one of aspects 1-10 and 12-23, further comprising a hinge pivotably coupling the valve body to the frame.

Aspect 12. The pressure relief assembly of any one of aspects 1-11 and 13-23, wherein the hinge is positioned oppositely of the first detent relative to the valve body in the lateral direction.

Aspect 13. The pressure relief assembly of any one of aspects 1-12 and 14-23, wherein the first detent extends laterally from the frame to the valve body.

Aspect 14. The pressure relief assembly of any one of aspects 1-13 and 15-23, further comprising a valve stem extending in an axial direction from the valve body, wherein the first detent extends laterally from the frame to the valve stem.

Aspect 15. The pressure relief assembly of any one of aspects 1-14 and 16-23, wherein the first detent is a spring-loaded detent.

Aspect 16. The pressure relief assembly of any one of aspects 1-15 and 17-23, wherein the first detent comprises a detent housing having a first end and an open second end, a compression spring disposed in the detent housing, the compression spring extending from the first end towards the open second end; and a detent engagement surface translatably disposed in the detent housing, wherein the compression spring is compressibly disposed between the detent engagement surface and the first end of the detent housing.

Aspect 17. The pressure relief assembly of any one of aspects 1-16 and 18-23, wherein the first detent is a magnet.

Aspect 18. The pressure relief assembly of any one of aspects 1-17 and 19-23, wherein the valve body has a circular profile in the lateral direction.

Aspect 19. The pressure relief assembly of any one of aspects 1-18 and 20-23, wherein the vent opening is geometrically parallel to the valve opening.

Aspect 20. The pressure relief assembly of any one of aspects 1-19 and 21-23, wherein the vent opening is geometrically non-parallel to the valve opening.

Aspect 21. The pressure relief assembly of any one of aspects 1-20 and 22-23, further comprising a guard coupled to the frame, wherein the guard defines a plurality of openings spaced laterally across the valve airflow pathway.

Aspect 22. The pressure relief assembly of any one of aspects 1-21 and 23, further comprising a guard coupled to the frame, wherein the guard defines a plurality of openings spaced laterally across the valve airflow pathway and the vent airflow pathway.

Aspect 23. The pressure relief assembly of any one of aspects 1-22, wherein the guard is positioned towards the first end of the valve assembly.

Aspect 24. A pressure relief assembly comprising:
- a frame comprising a coupling structure, a valve mounting surface, and a valve opening within the valve mounting surface, the pressure relief assembly having a first axial end, a second axial end, and a valve airflow pathway extending from the first axial end through the second axial end through the valve opening;
- a valve body sealably disposed on the valve mounting surface across the valve opening, whereby the valve airflow pathway is obstructed; and
- a first spring-loaded detent releasably securing the valve body to the frame, wherein the first spring-loaded detent is configured to release the valve body from the frame upon a minimum pressure differential across the valve opening,
- wherein the valve body is configured to be clear of the valve airflow pathway upon the minimum pressure differential across the valve opening.

Aspect 25. The pressure relief assembly of any one of aspects 24 and 26-44, wherein the first spring-loaded detent extends laterally from the frame to the valve body.

Aspect 26. The pressure relief assembly of any one of aspects 24-25 and 27-44, further comprising a valve stem extending in an axial direction from the valve body, wherein the first spring-loaded detent extends laterally from the frame to the valve stem.

Aspect 27. The pressure relief assembly of any one of aspects 24-26 and 28-44, further comprising a plurality of spring-loaded detents comprising the first spring-loaded detent, wherein each of the plurality of spring-loaded detents releasably secures the valve body to the frame, wherein each of the plurality of spring-loaded detents extend laterally from the frame to the valve body and each spring-loaded detent is configured to release the valve body from the frame upon the minimum pressure differential across the valve opening.

Aspect 28. The pressure relief assembly of any one of aspects 24-27 and 29-44, further comprising a vent, wherein the frame further comprises a vent mounting surface, and a vent opening within the vent mounting surface, wherein the vent opening is functionally parallel to the valve opening, and wherein the vent is coupled to the vent mounting surface across the vent opening.

Aspect 29. The pressure relief assembly of any one of aspects 24-28 and 30-44, further comprising a vent, wherein the valve body comprises a vent mounting surface and a vent opening within the vent mounting surface, wherein the vent opening is functionally parallel to the valve opening, and wherein the vent is coupled to the vent mounting surface across the vent opening.

Aspect 30. The pressure relief assembly of any one of aspects 24-29 and 31-44, wherein the valve comprises a valve sidewall around the vent opening and the frame comprises a frame sidewall around the valve opening, wherein the frame sidewall is spaced radially outward from the valve sidewall.

Aspect 31. The pressure relief assembly of any one of aspects 24-30 and 32-44, further comprising a vent cover extending laterally across the vent, wherein the vent is positioned axially between the frame and the vent cover.

Aspect 32. The pressure relief assembly of any one of aspects 24-31 and 33-44, wherein the vent cover and the valve body are a single, unitary component.

Aspect 33. The pressure relief assembly of any one of aspects 24-32 and 34-44, further defining an environmental opening perpendicular to the vent cover.

Aspect 34. The pressure relief assembly of any one of aspects 24-33 and 35-44, wherein the environmental opening is positioned axially between the vent cover and the vent.

Aspect 35. The pressure relief assembly of any one of aspects 24-34 and 36-44, wherein the environmental opening is defined by the vent cover.

Aspect 36. The pressure relief assembly of any one of aspects 24-35 and 37-44, wherein the vent opening is geometrically parallel to the valve opening.

Aspect 37. The pressure relief assembly of any one of aspects 24-36 and 38-44, wherein the vent opening is geometrically non-parallel to the valve opening.

Aspect 38. The pressure relief assembly of any one of aspects 24-37 and 39-44, wherein the vent is a breathable membrane.

Aspect 39. The pressure relief assembly of any one of aspects 24-38 and 40-44, further comprising a hinge pivotably coupling the valve body to the frame.

Aspect 40. The pressure relief assembly of any one of aspects 24-39 and 41-44, wherein the hinge is positioned oppositely of the first detent relative to the valve body in the lateral direction.

Aspect 41. The pressure relief assembly of any one of aspects 24-40 and 42-44, wherein the first spring-loaded detent comprises a detent housing having a first end and a second end, a compression spring disposed in the detent housing, the compression spring extending from the first end towards the second end; and a detent engagement surface translatably disposed in the detent housing, wherein the compression spring is compressibly disposed between the detent engagement surface and the first end of the detent housing.

Aspect 42. The pressure relief assembly of any one of aspects 24-41 and 43-44, wherein the valve body has a circular profile in the lateral direction.

Aspect 43. The pressure relief assembly of any one of aspects 24-42 and 44, further comprising a guard coupled to the frame, wherein the guard defines a plurality of openings spaced laterally across the valve airflow pathway.

Aspect 44. The pressure relief assembly of any one of aspects 24-43, wherein the guard is positioned towards the first end of the valve assembly.

Aspect 45. A pressure relief assembly comprising:
- a frame comprising a coupling structure, a valve mounting surface, and a valve opening within the valve mounting surface;
- a valve body sealably disposed on the valve mounting surface across the valve opening; and
- a first spring-loaded detent releasably securing the valve body to the frame, wherein the first spring-loaded detent is configured to release the valve body from the frame upon a minimum pressure differential across the valve opening,
- wherein the first spring-loaded detent comprises a detent housing having a first end and a second end, a compression spring disposed in the detent housing, the compression spring extending from the first end towards the second end; and a detent engagement surface translatably disposed in the detent housing, wherein the compression spring is compressibly disposed between the detent engagement surface and the first end of the detent housing.

Aspect 46. The pressure relief assembly of any one of aspects 45 and 47-65, wherein the frame comprises a vent mounting surface, and a vent opening within the vent mounting surface, wherein the vent opening is functionally parallel to the valve opening and the pressure relief assembly further comprises a vent coupled to the vent mounting surface across the vent opening.

Aspect 47. The pressure relief assembly of any one of aspects 45-46 and 48-65, further comprising a vent, wherein the valve body comprises a vent mounting surface and a vent opening within the vent mounting surface, wherein the vent opening is functionally parallel to the valve opening, and wherein the vent is coupled to the vent mounting surface across the vent opening.

Aspect 48. The pressure relief assembly of any one of aspects 45-47 and 49-65, wherein the vent opening is geometrically parallel to the valve opening.

Aspect 49. The pressure relief assembly of any one of aspects 45-48 and 50-65, wherein the vent opening is geometrically non-parallel to the valve opening.

Aspect 50. The pressure relief assembly of any one of aspects 45-49 and 51-65, further comprising a vent cover extending laterally across the vent, wherein the vent is positioned axially between the frame and the vent cover.

Aspect 51. The pressure relief assembly of any one of aspects 45-50 and 52-65, wherein the vent cover and the valve body are a single, unitary component.

Aspect 52. The pressure relief assembly of any one of aspects 45-51 and 53-65, further defining an environmental opening perpendicular to the vent cover.

Aspect 53. The pressure relief assembly of any one of aspects 45-52 and 54-65, wherein the environmental opening is positioned axially between the vent cover and the vent.

Aspect 54. The pressure relief assembly of any one of aspects 45-53 and 55-65, wherein the environmental opening is defined by the vent cover.

Aspect 55. The pressure relief assembly of any one of aspects 45-54 and 56-65, wherein the vent is a breathable membrane.

Aspect 56. The pressure relief assembly of any one of aspects 45-55 and 57-65, wherein the valve body has a circular profile in the lateral direction.

Aspect 57. The pressure relief assembly of any one of aspects 45-56 and 58-65, wherein the first spring-loaded detent extends laterally from the frame to the valve body.

Aspect 58. The pressure relief assembly of any one of aspects 45-57 and 59-65, further comprising a valve stem extending in an axial direction from the valve body, wherein the first spring-loaded detent extends laterally from the frame to the valve stem.

Aspect 59. The pressure relief assembly of any one of aspects 45-58 and 60-65, further comprising a second spring-loaded detent releasably securing the valve body to the frame.

Aspect 60. The pressure relief assembly of any one of aspects 45-59 and 61-65, wherein the second spring-loaded detent extends laterally from the frame to the valve body and is configured to release the valve body from the frame upon the minimum pressure differential across the valve opening.

Aspect 61. The pressure relief assembly of any one of aspects 45-60 and 62-65, further comprising a hinge pivotably coupling the valve body to the frame.

Aspect 62. The pressure relief assembly of any one of aspects 45-61 and 63-65, wherein the hinge is positioned oppositely of the first spring-loaded detent relative to the valve body in the lateral direction.

Aspect 63. The pressure relief assembly of any one of aspects 45-62 and 64-65, wherein the valve comprises a valve sidewall around the vent opening and the frame comprises a frame sidewall around the valve opening, wherein the frame sidewall is spaced radially outward from the valve sidewall.

Aspect 64. The pressure relief assembly of any one of aspects 45-63 and 65, further comprising a guard coupled to the frame, wherein the guard defines a plurality of openings spaced laterally across the valve airflow pathway.

Aspect 65. The pressure relief assembly of any one of aspects 45-64, wherein the guard is positioned towards the first end of the valve assembly.

It should also be noted that, as used in this specification and the appended claims, the phrase "configured" describes a system, apparatus, or other structure that is constructed to perform a particular task or adopt a particular configuration. The word "configured" can be used interchangeably with similar words such as "arranged", "constructed", "manufactured", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference. In the event that any inconsistency exists between the disclosure of the present application and the disclosure(s) of any document incorporated herein by reference, the disclosure of the present application shall govern.

This application is intended to cover adaptations or variations of the present subject matter. It is to be understood that the above description is intended to be illustrative, and not restrictive, and the claims are not limited to the illustrative embodiments as set forth herein.

What is claimed is:

1. A pressure relief assembly comprising:
    a frame comprising a coupling structure, a valve mounting surface, a valve opening within the valve mounting surface, a vent mounting surface, and a vent opening within the vent mounting surface, wherein the vent opening is functionally parallel to the valve opening;
    a valve body sealably disposed on the valve mounting surface across the valve opening;
    a first detent ball releasably securing the valve body to the frame, wherein the first detent ball is configured to release the valve body from the frame upon a minimum pressure differential across the valve opening such that at least 85% of the lateral area of the valve opening does not overlap with the lateral area of the valve body in the axial direction; and
    a vent coupled to the vent mounting surface across the vent opening.

2. The pressure relief assembly of claim 1, further comprising a hinge pivotably coupling the valve body to the frame.

3. The pressure relief assembly of claim 1, wherein the first detent ball extends laterally from the frame to the valve body.

4. The pressure relief assembly of claim 1, further comprising a valve stem extending in an axial direction from the valve body, wherein the first detent ball extends laterally from the frame to the valve stem.

5. The pressure relief assembly of claim 1, wherein the first detent ball comprises a detent housing having a first end and an open second end, a compression spring disposed in the detent housing, the compression spring extending from the first end towards the open second end; and a detent engagement surface translatably disposed in the detent housing, wherein the compression spring is compressibly disposed between the detent engagement surface and the first end of the detent housing.

6. The pressure relief assembly of claim 1, wherein the first detent ball is a magnet.

7. The pressure relief assembly of claim 1, wherein the vent opening is geometrically non-parallel to the valve opening.

8. The pressure relief assembly of claim 1, further comprising a guard coupled to the frame, wherein the guard defines a plurality of openings spaced laterally across the valve opening and the vent opening.

9. A pressure relief assembly comprising:
a frame comprising a coupling structure, a valve mounting surface, and a valve opening within the valve mounting surface, the pressure relief assembly having a first axial end, a second axial end, and a valve airflow pathway extending from the first axial end through the second axial end through the valve opening;
a valve body sealably disposed on the valve mounting surface across the valve opening, whereby the valve airflow pathway is obstructed; and
a first spring-loaded detent ball releasably securing the valve body to the frame, wherein the first spring-loaded detent ball is configured to release the valve body from the frame upon a minimum pressure differential across the valve opening,
wherein the valve body is configured toclear the valve airflow pathway upon the minimum pressure differential across the valve opening such that at least 85% of the lateral area of the valve opening does not overlap with the lateral area of the valve body in the axial direction.

10. The pressure relief assembly of claim 9, further comprising a vent, wherein the frame further comprises a vent mounting surface, and a vent opening within the vent mounting surface, wherein the vent opening is functionally parallel to the valve opening, and wherein the vent is coupled to the vent mounting surface across the vent opening.

11. The pressure relief assembly of claim 9, further comprising a vent, wherein the valve body comprises a vent mounting surface and a vent opening within the vent mounting surface, wherein the vent opening is functionally parallel to the valve opening, and wherein the vent is coupled to the vent mounting surface across the vent opening.

12. The pressure relief assembly of claim 11, wherein the valve body comprises a valve sidewall around the vent opening and the frame comprises a frame sidewall around the valve opening, wherein the frame sidewall is spaced radially outward from the valve sidewall.

13. The pressure relief assembly of claim 12, wherein the vent opening is geometrically parallel to the valve opening.

14. The pressure relief assembly of claim 12, wherein the vent opening is geometrically non-parallel to the valve opening.

15. The pressure relief assembly of claim 9, further comprising a hinge pivotably coupling the valve body to the frame.

16. A pressure relief assembly comprising:
a frame comprising a coupling structure, a valve mounting surface, and a valve opening within the valve mounting surface;
a valve body sealably disposed on the valve mounting surface across the valve opening; and
a first spring-loaded detent releasably securing the valve body to the frame, wherein the first spring-loaded detent is configured to release the valve body from the frame upon a minimum pressure differential across the valve opening,
wherein the first spring-loaded detent comprises a compression spring disposed in the valve body; and a detent engagement surface translatably disposed relative to the valve body, wherein the compression spring is compressed and extends laterally inward from the detent engagement surface.

17. The pressure relief assembly of claim 16, wherein the frame comprises a vent mounting surface, and a vent opening within the vent mounting surface, wherein the vent opening is functionally parallel to the valve opening and the pressure relief assembly further comprises a vent coupled to the vent mounting surface across the vent opening.

18. The pressure relief assembly of claim 16, wherein the valve body comprises a valve sidewall around a vent opening and the frame comprises a frame sidewall around the valve opening, wherein the frame sidewall is spaced radially outward from the valve sidewall.

19. The pressure relief assembly of claim 16, further comprising a guard coupled to the frame, wherein the guard defines a plurality of openings spaced laterally across the valve opening.

20. The pressure relief assembly of claim 19, wherein the guard is positioned towards a first axial end of the pressure relief assembly.

* * * * *